(12) United States Patent
Yin et al.

(10) Patent No.: US 11,997,042 B2
(45) Date of Patent: May 28, 2024

(54) SIMULTANEOUS HARQ-ACK AND SR TRANSMISSION ON NR PUCCH

(71) Applicant: Sharp Kabushiki Kaisha, Sakai (JP)

(72) Inventors: Zhanping Yin, Vancouver, WA (US); Toshizo Nogami, Osaka (JP); Tatsushi Aiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 16/968,704

(22) PCT Filed: Feb. 11, 2019

(86) PCT No.: PCT/US2019/017485
§ 371 (c)(1),
(2) Date: Aug. 10, 2020

(87) PCT Pub. No.: WO2019/160809
PCT Pub. Date: Aug. 22, 2019

(65) Prior Publication Data
US 2020/0374085 A1   Nov. 26, 2020

Related U.S. Application Data

(60) Provisional application No. 62/631,306, filed on Feb. 15, 2018.

(51) Int. Cl.
*H04L 5/00* (2006.01)
*H04L 1/1607* (2023.01)

(52) U.S. Cl.
CPC .......... *H04L 5/0053* (2013.01); *H04L 1/1671* (2013.01); *H04L 5/0055* (2013.01); *H04L 5/001* (2013.01)

(58) Field of Classification Search
CPC ... H04L 5/0053; H04L 1/1671; H04L 5/0055; H04L 5/001; H04L 1/0031; H04L 1/1861
USPC .......................................................... 370/330
See application file for complete search history.

(56) References Cited

U.S. PATENT DOCUMENTS

| | | | |
|---|---|---|---|
| 2011/0205981 A1 | 8/2011 | Koo et al. | |
| 2012/0287877 A1* | 11/2012 | Han | H04W 52/0216 370/329 |
| 2014/0301324 A1 | 10/2014 | Cheng et al. | |
| 2015/0200752 A1* | 7/2015 | Yin | H04L 1/1887 370/280 |
| 2016/0353388 A1 | 12/2016 | Han et al. | |
| 2018/0227938 A1* | 8/2018 | Lee | H04W 76/10 |
| 2018/0295540 A1* | 10/2018 | Akkarakaran | H04W 28/0278 |
| 2018/0324787 A1 | 11/2018 | Yin et al. | |

* cited by examiner

*Primary Examiner* — Mang Hang Yeung
(74) *Attorney, Agent, or Firm* — Austin Rapp

(57) ABSTRACT

A user equipment (UE) is described. The UE includes transmitting circuitry configured to transmit hybrid automatic repeat request acknowledgment/negative acknowledgement (HARQ-ACK) and scheduling request (SR) on a physical uplink control channel (PUCCH) scheduled for the HARQ-ACK transmission. The HARQ-ACK and the SR are transmitted on the PUCCH by applying a cyclic shift on sequences of symbols carrying uplink control information (UCI) bits.

4 Claims, 19 Drawing Sheets

SIMULTANEOUS HARQ-ACK AND SR TRANSMISSION ON NR PUCCH

RELATED APPLICATIONS

This application is related to and claims priority from U.S. Provisional Patent Application No. 62/631,306, entitled "SIMULTANEOUS HARQ-ACK AND SR TRANSMISSION ON NR PUCCH," filed on Feb. 15, 2018, which is hereby incorporated by reference herein, in its entirety.

TECHNICAL FIELD

The present disclosure relates generally to communication systems. More specifically, the present disclosure relates to simultaneous HARQ-ACK and scheduling request (SR) transmission on New Radio (NR) physical uplink control channel (PUCCH).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
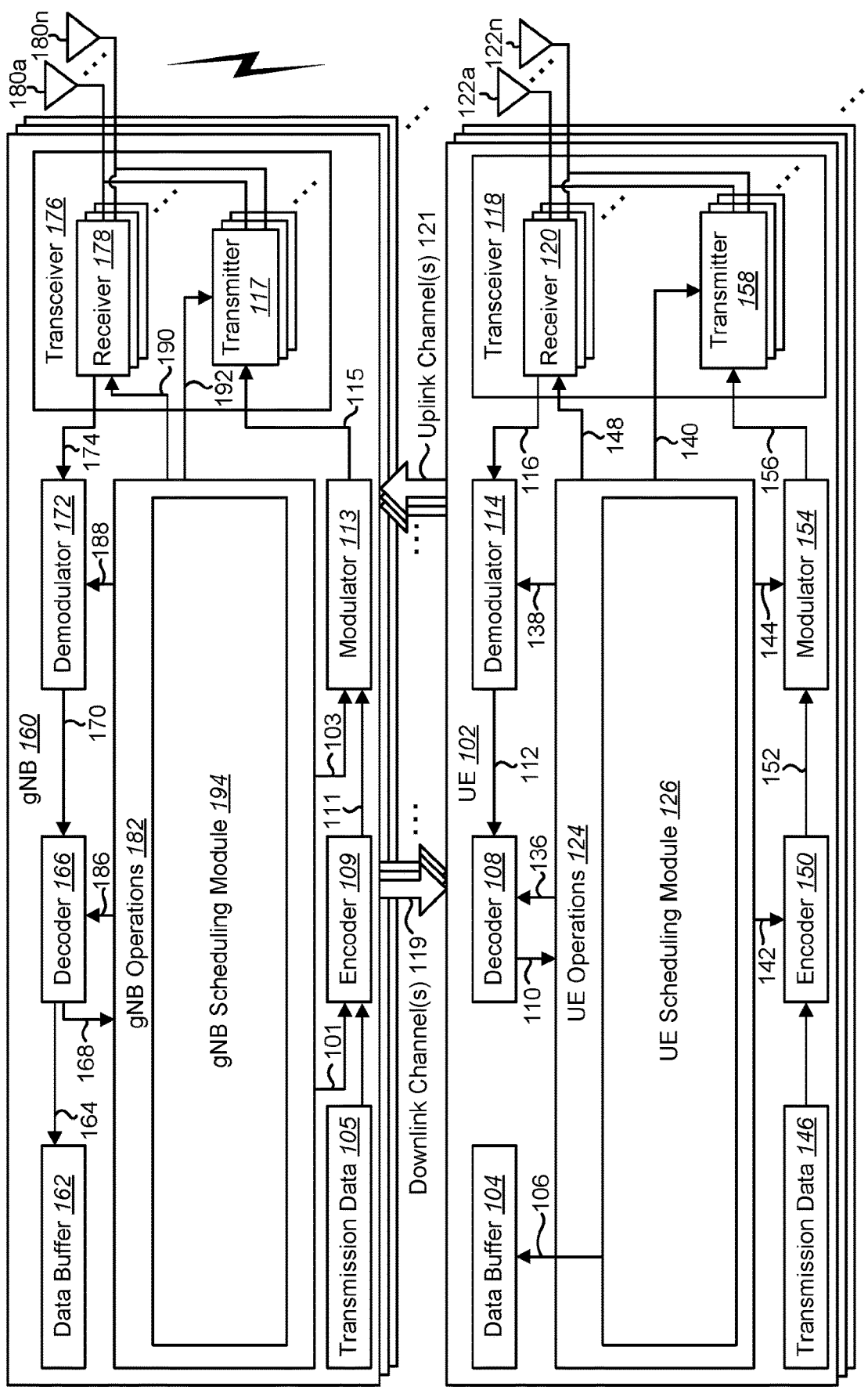
FIG. 1 is a block diagram illustrating one implementation of one or more gNBs and one or more UEs in which systems and methods for simultaneous HARQ-ACK and scheduling request (SR) transmission on New Radio (NR) physical uplink control channel (PUCCH) may be implemented.

A user equipment (UE) is described. The UE includes transmitting circuitry configured to transmit hybrid automatic repeat request acknowledgment/negative acknowledgement (HARQ-ACK) and scheduling request (SR) on a physical uplink control channel (PUCCH) scheduled for the HARQ-ACK transmission. The HARQ-ACK and the SR are transmitted on the PUCCH by applying a cyclic shift on sequences of symbols carrying uplink control information (UCI) bits.

A base station apparatus is also described. The base station apparatus includes receiving circuitry configured to receive hybrid automatic repeat request acknowledgment/negative acknowledgement (HARQ-ACK) feedback and scheduling request (SR) on a physical uplink control channel (PUCCH) scheduled for the HARQ-ACK reception. The HARQ-ACK and the SR are received on the PUCCH by applying a cyclic shift on sequences of symbols carrying uplink control information (UCI) bits.

A communication method of a user equipment is also described. The method includes transmitting hybrid automatic repeat request acknowledgment/negative acknowledgement (HARQ-ACK) and scheduling request (SR) on a physical uplink control channels (PUCCH) scheduled for the HARQ-ACK transmission. The HARQ-ACK and the SR are transmitted on the PUCCH by applying a cyclic shift on sequences of symbols carrying uplink control information (UCI) bits.

A communication method of a base station apparatus is also described. The method includes receiving hybrid automatic repeat request acknowledgment/negative acknowledgement (HARQ-ACK) and scheduling request (SR) on a physical uplink control channel (PUCCH) scheduled for the HARQ-ACK reception. The HARQ-ACK and the SR are received on the PUCCH by applying a cyclic shift on sequences of symbols carrying uplink control information (UCI) bits.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NW" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In NR, multiple PUCCH formats are defined that can be used to report various UCI. In some instances, multiple UCI may be reported on different PUCCHs in the same slot with partial or fully overlap between them. Different rules may be applied to handle the partial and fully PUCCH overlapping cases for different combinations of UCI contents. The systems and methods described herein provide for simultaneous HARQ-ACK and SR reporting on PUCCH, especially for PUCCH format 0 (short PUCCH up to 2 bits of UCI) and format 1 (i.e., long PUCCH up to 2 bits of UCI). If a HARQ-ACK transmission on a PUCCH from a UE using PUCCH format 1 overlaps in time with PUCCH resources for SR, simultaneous HARQ-ACK and SR can be reported on the HARQ-ACK PUCCH by applying a cyclic shift on the sequences of the symbols carrying UCI bits Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for simultaneous HARQ-ACK and scheduling request (SR) transmission on New Radio (NR) physical uplink control channel (PUCCH) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform simultaneous HARQ-ACK and SR transmission on an NR PUCCH. In a first aspect, NR PUCCH formats and UCI reporting are described. The physical uplink control channel supports multiple formats as shown in Table 1.

TABLE 1

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

As given in Table 1, NR defines multiple PUCCH formats. Short PUCCH may be 1-2 symbols. Short PUCCH may include Format 0 (less than or equal to 2 bits, sequence based) and/or Format 2 (more than 2 bits, OFDM based). Long PUCCH may be greater than or equal to 4 symbols. Long PUCCH may include Format 1 (less than or equal to 2 bits, sequence based), Format 3 (more than 2 bits, DFT-S-OFDM based, no UE multiplexing) and/or Format 4 (more than 2 bits, DFT-S-OFDM based, with UE multiplexing).

If a UE 102 is not transmitting PUSCH, and the UE 102 is transmitting UCI, the UE 102 may transmit UCI on PUCCH format 0 if the transmission is over 1 symbol or 2 symbols and/or the number of UCI bits is 1 or 2. The UE 102 may transmit UCI on PUCCH format 1 if the transmission is over 4 or more symbols and/or the number of UCI bits is 1 or 2. The UE 102 may transmit UCI on PUCCH format 2 if the transmission is over 1 symbol or 2 symbols and/or the number of UCI bits is more than 2. The UE 102 may transmit UCI on PUCCH format 3 if the transmission is over 4 or more symbols and/or the number of UCI bits is more than 2. The UE 102 may transmit UCI on PUCCH format 4 if the transmission is over 4 or more symbols; the number of UCI bits is more than 2 and/or a PUCCH resource includes an orthogonal cover code.

For PUCCH format 3 or for PUCCH format 4, a UE 102 can be configured by higher layer parameter PUCCH-F3-F4-additional-DMRS, a number of symbols used for DM-RS.

For PUCCH formats 1, 3, or 4, a UE can be configured a number of slots, $N_{PUCCH}^{repeat}$, for a PUCCH transmission by respective higher layer parameters PUCCH-F1-number-of-slots, PUCCH-F3-number-of-slots, or PUCCH-F4-number-of-slots.

For $N_{PUCCH}^{repeat}>1$, the UE 102 may repeat the UCI in the PUCCH transmission in the first slot of the $N_{PUCCH}^{repeat}$ slots in the PUCCH transmission in each of the remaining $N_{PUCCH}^{repeat}-1$, slots. A PUCCH transmission may have the same number of consecutive symbol, as provided by higher layer parameter PUCCH-F1-F3-F4-number-of-symbols, in each of the $N_{PUCCH}^{repeat}$ slots. A PUCCH transmission may have a same first symbol, as provided by higher layer parameter PUCCH-F1-F3-F4-starting-symbol, in each of the $N_{PUCCH}^{repeat}$ slots.

For $N_{PUCCH}^{repeat}>1$, the UE 102 may be configured by higher layer parameter PUCCH-F1-F3-F4-interslot-FH whether or not to perform frequency hopping for PUCCH transmissions in different slots. If PUCCH-F1-F3-F4-interslot-FH=ON, a first PRB for PUCCH transmission is provided by higher layer parameter PUCCH-starting-PRB and a second PRB for PUCCH transmission is provided by higher layer parameter PUCCH-2nd-hop-PRB.

For $N_{PUCCH}^{repeat}>1$, if the UE 102 is configured to perform frequency hopping for PUCCH transmissions in different slots, the UE 102 may perform frequency hopping per slot and/or the UE 102 is not expected to be configured to perform frequency hopping for a PUCCH transmission within a slot.

If a UE 102 is provided higher layer parameter UL-DL-configuration-common or is additionally provided higher layer parameter UL-DL-configuration-dedicated for the slot format per slot over the number of slots, the UE 102 may determine the $N_{PUCCH}^{repeat}$ slots for a PUCCH transmission as the first slots starting from a slot indicated to the UE 102 and having an UL symbol for a symbol provided by higher layer parameter PUCCH-F1-F3-F4-starting-symbol is an UL symbol, and consecutive UL symbols, starting from the symbol, equal to a number of symbols provided higher layer parameter PUCCH-F1-F3-F4-number-of-symbols.

If a UE 102 is not provided higher layer parameter UL-DL-configuration-common, the UE 102 may determine the $N_{PUCCH}^{repeat}$ slots for a PUCCH transmission as the $N_{PUCCH}^{repeat}$ consecutive slots starting from a slot indicated to the UE 102.

For long PUCCH format 1, 3 and 4, multi-slot transmission is supported by configuring the number of slots (nrofSlots) for PUCCH repetition. The nrofSlots parameter may be chosen among the value set of {1,2,4,8}. For a multi-slot long PUCCH transmission, the PUCCH format resource (i.e., RB location, number of symbols, etc.) may be determined by the initial PUCCH transmission. In each consecutive PUCCH transmission, the same PUCCH location within a slot is used. The PUCCH transmission may repeat until the configured number of slots is reached.

The PUCCH can be used to report different kinds of UCI, including HARQ-ACK, where PUCCH format 0 or 1 can be used if the number of HARQ-ACK bits is up to 2 bits and/or PUCCH format 2 or 3 or 4 can be used if the number of HARQ-ACK bits is more than 2 bits.

PUCCH can be used to report channel state information. CSI may include channel quality indicator (CQI), preceding matrix indicator (PMI), CSI-RS resource indicator (CRI), strongest layer indication (SLI), rank indication (RI) and/or and L1-RSRP. A CSI report can be a periodic CSI (P-CSI), semi-persistent CSI or an aperiodic CSI (A-CSI). A CSI may include CSI part 1 and CSI part 2. A CSI PUCCH resource can be PUCCH format 2/3/4. For P-CSI, the PUCCH resource may be semi-statically configured by higher layer signaling. For A-CSI, the PUCCH resource can be dynamically indicated.

PUCCH can be used to report a scheduling request (SR). Multiple SR configurations may be configured for a UE 102. Each SR configuration may be linked to a different traffic type or service. A SR configuration may include a SR PUCCH format and resource, a periodicity and an offset within the periodicity. Since SR only carries one bit, a SR PUCCH resource may be configured with PUCCH format 0 or PUCCH format 1.

In NR, the sequence $r_{u,v}^{(\alpha,\delta)}(n)$ is defined by a cyclic shift $\alpha$ of a base sequence $\bar{r}_{u,v}(n)$ according to $$r_{u,v}^{(\alpha,\delta)}(n) = e^{j\alpha\left(n+\delta\frac{(\omega \bmod 2)}{2}\right)}\bar{r}_{u,v}(n), 0 \le n < M_{ZC} - 1$$

where $M_{ZC}=mN_{SC}^{RB}/2^\delta$ is the length of the sequence and $1<m\le N_{RB}^{max,UL}$. Multiple sequences are defined from a single base sequence through different values of $\alpha$ and $\delta$. The quantity $\omega=0$.

Base sequences $\bar{r}_{u,v}(n)$ are divided into groups, where $u \in \{0,1,\ldots,29\}$ is the group number and v is the base sequence number within the group, such that each group contains one base sequence (v=0) of each length $M_{ZC}=mN_{SC}^{RB}$, $1\le m\le5$ and two base sequences (v=0,1) of each length $M_{ZC}=mN_{SC}^{RB}$, $6\le m\le N_{RB}^{max,UL}$. The definition of the base sequence $\bar{r}_{u,v}(0),\ldots,\bar{r}_{u,v}(M_{ZC}-1)$ depends on the sequence length $M_{ZC}$.

PUCCH formats 0, 1, 3, and 4 use sequences $r_{u,v}^{(\alpha,\delta)}(n)$ given above with $\delta=0$ where the sequence group u and the sequence number v depend on the sequence hopping and the cyclic shift $\alpha$ depends on the cyclic shift hopping.

The sequence group $u=(f_{gh}+f_{ss})$ mod 30 and the sequence number v within the group depend on the hopping mode. If neither group, nor sequence hopping shall be used, then $f_{gh}=0$ $f_{ss}=n_{ID}$ mod 30

$v=0$ where $n_{ID}$ is given by [5, TS 38.213].

If group hopping but not sequence hopping shall be used, then $f_{gh}=(\Sigma_{m=0}^{7} 2^m c(8n_s+m))$ mod 30

$f_{ss}=n_{ID}$ mod 30

$v=0$ where the pseudo-random sequence c(i) is defined by clause 5.2.1 and where $n_{ID}$ is given by [5, TS 38.213].

If sequence hopping but not group hopping shall be used $f_{gh}=0$ $f_{ss}=n_{ID}$ mod 30

$v=c(n_s)$ where the pseudo-random sequence c(i) is defined by clause 5.2.1 where $n_{ID}$ is given by [5, TS 38.213].

The cyclic shift a varies as a function of the symbol and slot number according to $$\alpha_l = \frac{2\pi}{N_{SC}^{RB}}((m_0 + m_{CS} + n_{CS}(n_S, l+l')) \bmod N_{SC}^{RB})$$

where $n_s$ is the slot number in the radio frame; l is the OFDM symbol number in the PUCCH transmission where l=0 corresponds to the first OFDM symbol of the PUCCH transmission; l' is the index of the OFDM symbol in the slot that corresponds to the first OFDM symbol of the PUCCH transmission in the slot given by [5, TS 38.213]; $m_0$ is given by [5, TS 38.213]; and $m_{cs}=0$ except for PUCCH format 0 when it depends on the information to be transmitted according to [clause 9.2 of 5, TS 38.213].

The function $n_{cs}(n_s,l)$ is given by $$n_{cs}(n_s,l)=\Sigma_{m=0}^{7}2^m c(14\cdot 8 n_s+8l+m)$$

where the pseudo-random sequence c(i) is defined by clause 5.21. The pseudo-random sequence generator may be initialized with $c_{init}=n_{ID}$, where $n_{ID}$ is given by [5, TS 38.213], at the beginning of each radio frame.

In a second aspect, PUCCH collision cases for UCI reporting are described. The HARQ-ACK is a feedback for a PDSCH transmission, which may be scheduled at any slot. Also CSI and SR may be scheduled with different periodicity. Therefore, multiple UCI instances may be reported in the same slot, and cause a collision between PUCCHs carrying different UCI.

Figure 2:
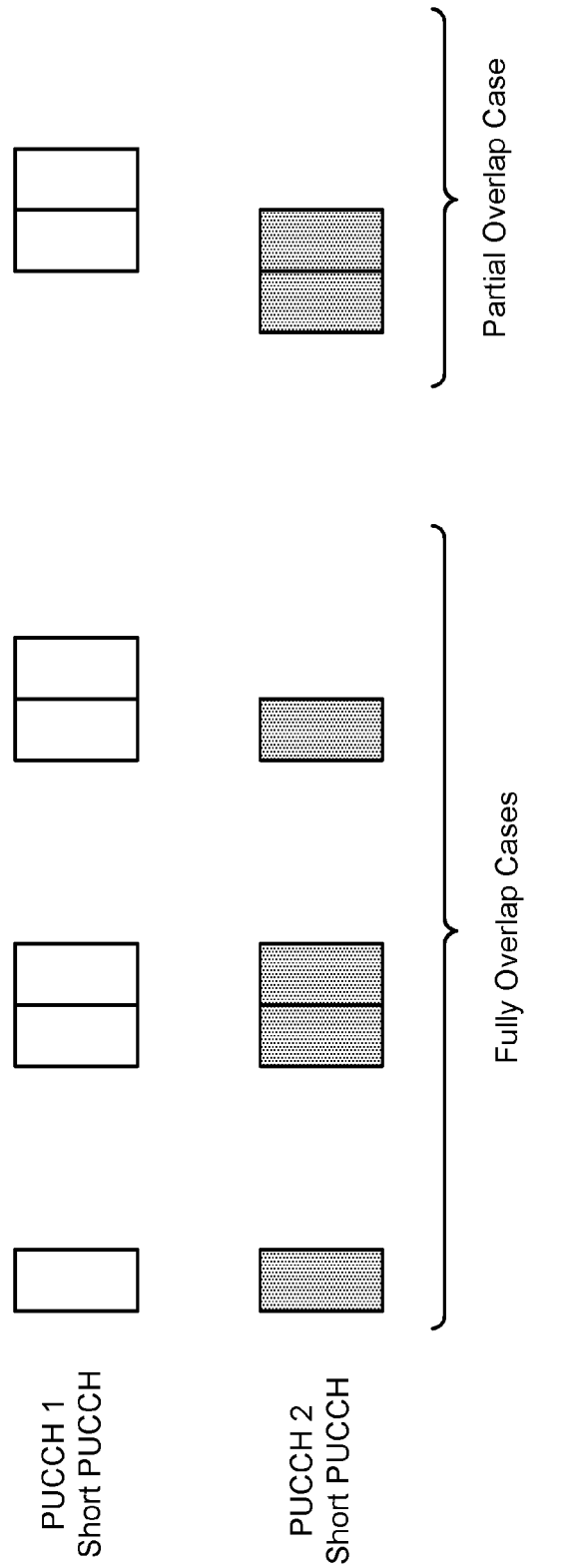
FIG. 2 is an example illustrating combinations of PUCCH collisions between short PUCCH and short PUCCH.
Figure 3:
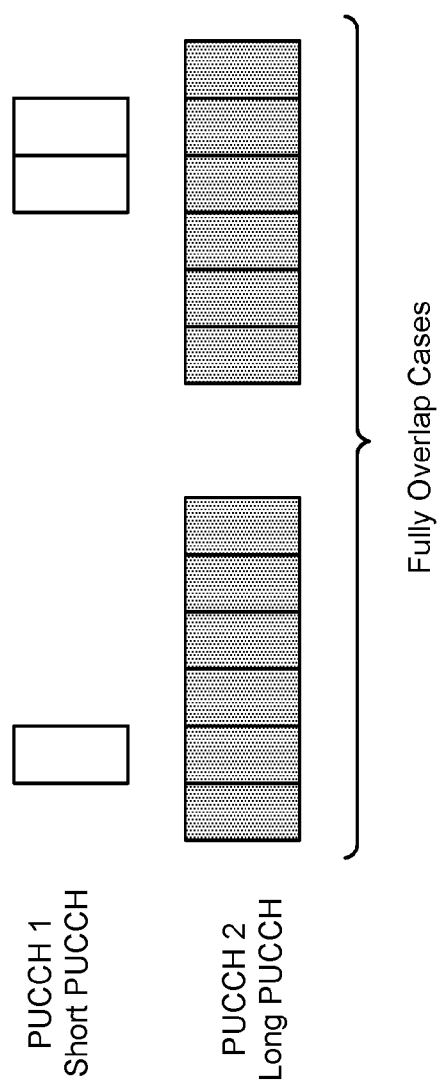
FIG. 3 is an example illustrating combinations of PUCCH collisions between short PUCCH and long PUCCH.
Figure 4:
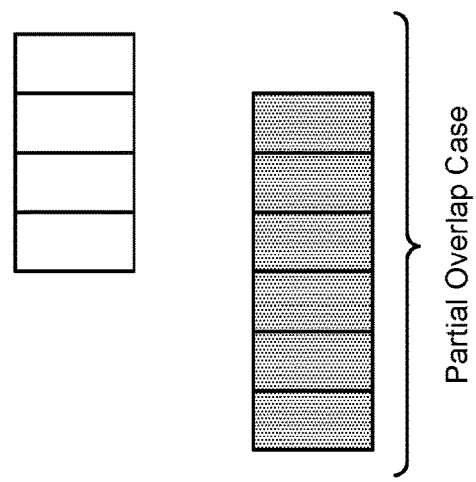
FIG. 4 is an example illustrating combinations of PUCCH collisions between long PUCCH and long PUCCH.
Figure 4:
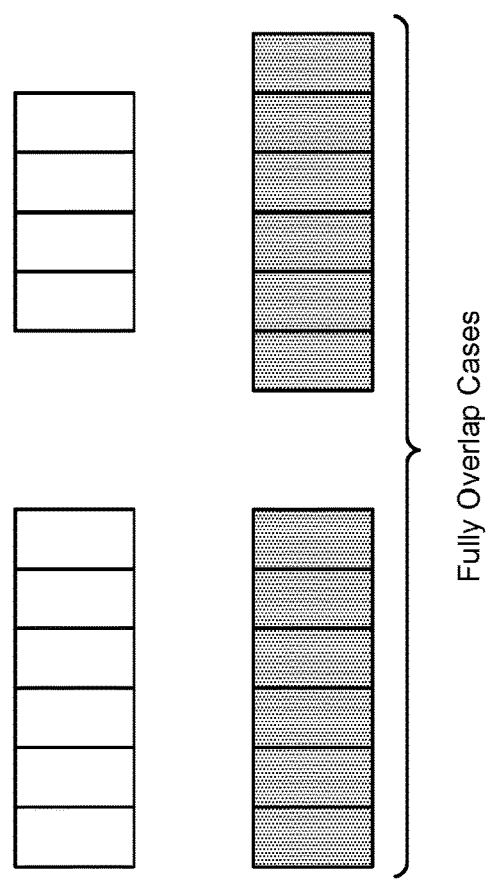

In NR, since multiple PUCCH formats are defined, and the durations of a PUCCH can be configurable, there are many different collision cases between PUCCHs. FIG. 2 illustrates the combinations of PUCCH collisions between short PUCCH and short PUCCH. FIG. 3 illustrates the combinations of PUCCH collisions between short PUCCH and long PUCCH. FIG. 4 illustrates the combinations of PUCCH collisions between long PUCCH and long PUCCH.

For the collision cases, the PUCCHs can be fully overlapped (i.e., one PUCCH occupies the same symbols or is contained within another PUCCH). The PUCCHs can be partial overlapped (i.e., some symbols of one PUCCH overlaps with another PUCCH). For both fully overlap and partial overlap cases, the number of overlapping symbols can be different based on the durations and the relative starting positions of the PUCCHs. It is neither feasible nor necessary to define different behaviors for each combination.

Considering different types of UCI may have different priority and delay tolerance, a common framework may be designed for any collision cases (i.e., for both partial overlap and fully overlap cases), as described herein.

In a third aspect, collision between HARQ-ACK and SR is described herein. All collision cases in FIGS. 2-4 may happen between HARQ-ACK and SR. SR is used to request UL data transmission from a gNB 160, and it is not as time sensitive as HARQ-ACK. Even for SR with URLLC, there is grant free transmission already. In practice, the gNB 160 should be able to schedule SR and A/N resources so that no collision occurs. Since only 1 bit is carried on a SR PUCCH resource, there is no good reason to configure different PUCCH formats for HARQ-ACK up to 2 bits and a SR resource.

Since the SR is not very delay sensitive as HARQ-ACK, it is reasonable to assume that the SR information within the HARQ-ACK PUCCH duration is known before the HARQ-ACK PUCCH transmission. Therefore, as a general rule, in case of simultaneous SR and HARQ-ACK transmission, the HARQ-ACK resource should be used. This is because the HARQ-ACK resource is more dynamically determined with a timing relationship to the PDSCH transmission.

In a first case (Case 1), HARQ-ACK reporting may be implemented with PUCCH Format 0. In a case of a collision when SR and HARQ-ACK are all scheduled with PUCCH format 0, the same method can be applied to both fully overlap and partial overlap cases. Therefore, for simultaneous transmission of 1 or 2 bits HARQ-ACK and 1 bit of SR using PUCCH format 0, in the case of negative SR, the same PUCCH resources as for HARQ-ACK only transmission may be used. In the case of positive SR, HARQ-ACK may be transmitted on the PRB for HARQ-ACK only transmission.

The mapping of ACK and NACK to cyclic shifts may be based on the index of initial cyclic shift of the HARQ-ACK only ($CS_{initial}$) and a fixed mapping pattern as given in Table 2 and Table 3 below corresponding to 1 and 2 bits HARQ-ACK, respectively. Table 2 provides a mapping pattern for 1-bit HARQ-ACK and positive SR. Table 3 provides a mapping pattern for 2-bit HARQ-ACK and positive SR.

TABLE 2

| HARQ-ACK | NACK | ACK |
|---|---|---|
| Cyclic shift | $(CS_{initial} + 3)\mod 12$ | $(CS_{initial} + 9)\mod 12$ |

TABLE 3

| HARQ-ACK | NACK, NACK | NACK, ACK | ACK, ACK | ACK, NACK |
|---|---|---|---|---|
| Cyclic shift | $(CS_{initial} + 1)\mod 12$ | $(CS_{initial} + 4)\mod 12$ | $(CS_{initial} + 7)\mod 12$ | $(CS_{initial} + 10)\mod 12$ |

Note that a maximum 12 SR per PRB can be configured with semi-static SR simultaneously. One PRB can support simultaneous transmission of 2-bit HARQ-ACK with SR only for one UE 102. The four remaining resources can be used for other purposes (e.g., 1-bit A/N with SR or 2-bit A/N only).

If there are multiple configured SR resources that overlap in time with the HARQ-ACK PUCCH resource, in one method, only 1 bit of SR can be reported with the given method above. Since the capacity of the PUCCH format 0 is only up to 2 bits, it is hard to multiplex multiple SR bits. Therefore, if there is any positive SR for the multiple configured resources that partial/fully overlap the PUCCH for HARQ-ACK transmission, 1 bit of SR is reported together with HARQ-ACK as given above. The gNB 160 may assume that the SR with the highest priority is reported. Each SR configuration corresponds to a logical channel. Different logical channels are used for different data transfer services which may require different numerologies and/or TTI duration and/or different packet of data size. Therefore, if the gNB always schedule based on the SR with the highest priority, there may be mismatch on the scheduled Hence resources and will be wasted and latency requirements for the pending traffic.

As an extension to 1 bit SR solution, multiple SR configurations in a single report can be support with some limitation. A different SR configuration can be reported with a different cyclic shift values over the sequences for HARQ-ACK feedback.

For example, in case of 1 bit HARQ-ACK, there are 5 available cyclic shifts between the two HARQ-ACK states. Thus, a maximum of 5 SR configurations may be differentiated by applying different cyclic shift offset values over the cyclic shift for HARQ-ACK values. To protect the HARQ-ACK performance, UE may support only 3 cyclic shift values in the middle of the cyclic shifts for HARQ-ACK values, namely, with a cyclic shift offset of 2, 3, and 4 over the cyclic shifts for HARQ-ACK values respectively. To optimize the distance between different values between the different cyclic shift values, it is better to start the cyclic shift value from the middle of two cyclic shift values for the HARQ-ACK. Therefore, assume there are K (K<=5) SR configurations overlaps with a PUCCH format 0 resource for HARQ-ACK feedback, for the kth (where k=0,1, . . . K−1) SR configuration within the set of K SR configurations can be represented by a cyclic shift offset over the cyclic shift for HARQ-ACK values, as given in Table 4 To protect the HARQ-ACK performance, UE may support only 3 cyclic shift values in the middle of the cyclic shifts for HARQ-ACK values, namely, support K=3 only with a cyclic shift offset of 2, 3, and 4 over the cyclic shifts for HARQ-ACK values respectively. Thus, only the first 3 entries k=0,1,2 may be supported in Table 4.

TABLE 4

| HARQ-ACK | NACK and kth SR | ACK and kth SR |
|---|---|---|
| Cyclic shift | $(CS_{initial} + 3)$mod12 if k = 0<br>$(CS_{initial} + 2)$mod12 if k = 1<br>$(CS_{initial} + 4)$mod12 if k = 2<br>$(CS_{initial} + 1)$mod12 if k = 3<br>$(CS_{initial} + 5)$mod12 if k = 4 | $(CS_{initial} + 9)$mod12 if k = 0<br>$(CS_{initial} + 8)$mod12 if k = 1<br>$(CS_{initial} + 10)$mod12 if k = 2<br>$(CS_{initial} + 7)$mod12 if k = 3<br>$(CS_{initial} + 11)$mod12 if k = 4 |

Similarly, in case of 2 bits HARQ-ACK, there are 2 available cyclic shifts between the HARQ-ACK states. Thus, up to K=2 SR configurations can be reported by cyclic shift offset of 1 and 2, for the kth SR configuration within the set of K configurations, the cyclic shift offsets are given in Table 5.

TABLE 5

| HARQ-ACK | NACK, NACK and kth SR | NACK, ACK and kth SR | ACK, ACK and kth SR | ACK, NACK and kth SR |
|---|---|---|---|---|
| Cyclic shift | $(CS_{initial} +1)$mod12 if k = 0<br>$(CS_{initial} + 2)$mod12 if k = 1 | $(CS_{initial} + 4)$mod12 if k = 0<br>$(CS_{initial} + 5)$mod12 if k = 1 | $(CS_{initial} + 7)$mod12 if k = 0<br>$(CS_{initial} + 8)$mod12 if k = 1 | $(CS_{initial} + 10)$mod12 if k = 0<br>$(CS_{initial} + 11)$mod12 if k = 1 |

The limit of number of SRs K with simultaneous HARQ-ACK reporting on Format 0 may be configured for a UE. For both 1 bit and 2 bit HARQ-ACK cases, the actual number of SR configurations (denote as N) that overlaps with the HARQ-ACK PUCCH resource may be higher than the limit value K above. In such cases, the N SR configurations can be evenly distributed into K sets of SR configurations, each set contains either a floor(N/K) or a ceil(N/K) SR configurations. And the SR feedback for the subset of SR configurations can be reported.

In a second case (Case 2), HARQ-ACK reporting may be implemented with PUCCH Format 1. Since the SR is not very delay sensitive as HARQ-ACK, it is reasonable to assume that the SR information within the HARQ-ACK PUCCH duration is known before the HARQ-ACK PUCCH transmission configured with PUCCH format 1.

PUCCH format 1 supports up to 2 bits of UCI. The block of bits $b(0), \ldots, b(M_{bit}-1)$ shall be modulated as described in clause 5.1 using BPSK if $M_{bit}=1$ and QPSK if $M_{bit}=2$, resulting in a complex-valued symbol d (0).

The complex-valued symbol d(0) shall be multiplied with a sequence $r_{u,v}^{(\alpha)}(n)$ according to $$y(n)=d(0) \cdot r_{u,v}^{(\alpha,\delta)}(n)$$

$$n=0,1,\ldots,N_{SC}^{RB}-1$$

where $r_{u,v}^{(\alpha,\delta)}(n)$ is given above. The block of complex-valued symbols $y(0), \ldots, y(N_{SC}^{RB}-1)$ shall be block-wise spread with the orthogonal sequence $w_i(m)$ according to $$z(m' N_{SC}^{RB} N_{SF,0}^{PUCCH,1} + m N_{SC}^{RB} + n) = w_i(m) \cdot y(n)$$

$$n = 0, 1, \ldots, N_{SC}^{RB} - 1$$

$$m = 0, 1, \ldots, N_{SF,m'}^{PUCCH,1} - 1$$

$$m' = \begin{cases} 0 & \text{no intra-slot frequency hopping} \\ 0, 1 & \text{intra-slot frequency hopping enabled} \end{cases}$$

where $N_{SF,m'}^{PUCCH,1}$ is given by Table 4.

The orthogonal sequence $w_i(m)$ is given by Table 5 where i is the index of the orthogonal sequence to use according to [5, TS 38.213]. In a case of a PUCCH transmission spanning multiple slots, the PUCCH sequence may be repeated for the subsequent slots. Table 6 provides the number of PUCCH symbols and the corresponding $N_{SF,m'}^{PUCCH,1}$. Table 7 provides orthogonal sequences $w_i(m)=e^{j2\pi\phi(m)/N_{SF}}$ for PUCCH format 1.

TABLE 6

| PUCCH length, $N_{symb}^{PUCCH,1}$ | $N_{SF,m'}^{PUCCH,1}$ | | |
|---|---|---|---|
| | No intra-slot hopping | Intra-slot hopping | |
| | m' = 0 | m' = 0 | m' = 1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

TABLE 7

| $N_{SF,m'}^{PUCCH,1}$ | φ | | | | | | |
|---|---|---|---|---|---|---|---|
| | i = 0 | i = 1 | i = 2 | i = 3 | i = 4 | i = 5 | i = 6 |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

In order to multiplex SR on a Format 1 HARQ-ACK PUCCH resource, additional dimensions should be used. In PUCCH format 1, the cyclic shift parameter $m_{cs}$=0. Thus, the cyclic shift value on the sequences of UCI symbols can be explored to carry additional SR information.

In one method, only a single SR bit is supported to be jointly reported with HARQ-ACK with Format 1. Therefore, for simultaneous transmission of 1 or 2 bits HARQ-ACK and SR using PUCCH format 1. In case of negative SR, the same PUCCH resources as for HARQ-ACK only transmission are used. In case of positive SR, HARQ-ACK and SR are reported on the PRB for HARQ-ACK only transmission with a cyclic shift offset on the sequences of UCI carrying symbols.

The sequence multiplied with the HARQ-ACK bits on UCI symbols are modified with a cyclic shift offset. For example, the sequence used for PUCCH format 1 to transmit the HARQ-ACK bits may be generated based on a value of the cyclic shift offset associated with the SR bits. Table 8 provides a sequence with cyclic shift for HARQ-ACK and negative SR and HARQ-ACK and positive SR.

TABLE 8

| HARQ-ACK and negative SR | HARQ-ACK and positive SR |
|---|---|
| Sequence with cyclic shift based on $m_{cs} = 0$ | Sequence with cyclic shift based on $m_{cs} = CS_{offset}$ |

To maximize the distance between the cyclic shifts, the $CS_{offset}$ can be 6 in case of only 1 bit of SR is supported for simultaneous HARQ-ACK and SR on PUCCH format 1. However, $CS_{offset}$ can also be specified as a fixed value between 1 and 6 inclusive. The cyclic shift offset $CS_{offset}$ can be indicated and determined by system information in the remaining minimum system information (RMSI) as a default value (e.g., a first value of the cyclic shift offset). The cyclic shift offset $CS_{offset}$ (e.g., a second value of the cyclic shift offset) can be configured with dedicated higher layer signaling (i.e. RRC signaling). If the cyclic shift offset is indicated by the dedicated RRC signaling, the cyclic shift offset indicated by the dedicated RRC signaling overrides the cyclic shift offset indicated by the RMSI. If the cyclic shift offset is not indicated by dedicated RRC signaling, the cyclic shift offset indicated by system information in remaining minimum system information (RMSI) is used.

Besides the cyclic shift offset applied to sequences on UCI carrying symbols, the same cyclic shift offset may also be applied to the sequences of the DMRS symbols as well. Thus, in case of negative SR, the same PUCCH resources and base sequences as for HARQ-ACK-only transmission are used. In case of positive SR, HARQ-ACK and SR are reported on the PRB for HARQ-ACK only transmission with a cyclic shift offset applied to both UCI and DMRS symbols, as defined in Table 8.

In another method, multiple SR bits may be supported to be jointly reported with HARQ-ACK with Format 1. Thus, if the HARQ-ACK is reported with PUCCH Format 1, and if there are multiple configured SR resources overlaps in time with the HARQ-ACK PUCCH resource, different cyclic shift value may be used to indicate different SR configuration since a sequence has 12 cyclic shifts. In NR, a UE may be configured with up to 8 SR configurations. Therefore, by using different cyclic shift values, the UE can report which SR is triggered with a PUCCH format 1 HARQ-ACK reporting.

If a HARQ-ACK transmission on a PUCCH resource (e.g., the PUCCH resource for the HARQ-ACK bits) from a UE 102 using PUCCH format 1 overlaps in time with K PUCCH resources, each configured for a SR (e.g., the PUCCH resources is configured for the SR bits), up K different cyclic shift values should be used to indicate which SR is triggered. In case of no SR is triggered, the same PUCCH resource(s) as for HARQ-ACK only transmission are used. In case of positive SR from the kth configured SR, with a given cyclic shift offset value $CS_{offset}$ for the kth SR configuration, the sequences carrying the HARQ-ACK bits should be shifted with a cyclic shift based on $m_{cs}=CS_{offset}*(k+1)$, where k=0,1, . . . K−1, as given in Table 9. Note that even with K SR configurations, only one SR configuration should be triggered and reported simultaneously with HARQ-ACK.

TABLE 9

| HARQ-ACK and negative SR | HARQ-ACK and positive SR on k-th indexed SR within K SR configurations, where k = 0, 1, . . . K − 1 |
|---|---|
| Sequence with cyclic shift based on $m_{cs} = 0$ | Sequence with cyclic shift based on $m_{cs} = CS_{offset} * (k + 1)$ |

Therefore, for simultaneous transmission of 1 or 2 bits HARQ-ACK and multiple SR configurations using PUCCH format 1, in case of negative SR, the same PUCCH resources as for HARQ-ACK only transmission are used. In case of positive SR on the kth SR configuration, HARQ-ACK and SR are reported on the PRB for HARQ-ACK only transmission with a cyclic shift offset given by Table 9 on the sequences of UCI carrying symbols.

Besides the cyclic shift offset applied to sequences on UCI carrying symbols, the same cyclic shift offset may also be applied to the sequences of the DMRS symbols as well. Thus, in case of negative SR, the same PUCCH resources and base sequences as for HARQ-ACK only transmission are used. In case of positive SR on the kth SR configuration, HARQ-ACK and SR are reported on the PRB for HARQ-ACK only transmission with a cyclic shift offset given by Table 9 applied to both UCI and DMRS symbols.

The cyclic shift offset value may determine the maximum supported SR configurations of the given UE 102. If the cyclic shift offset $CS_{offset}$ value is 1, there are 11 available cyclic shifts available. Thus, the UE 102 can be configured with the maximum number of SR configurations, which is 8 (e.g., in the current release).

If the cyclic shift offset $CS_{offset}$ value is 2, there are 5 available cyclic shifts available. Thus, the UE 102 can be configured with up to 5 SR configurations.

If the cyclic shift offset $CS_{offset}$ value is 3, there are 3 available cyclic shifts available. Thus, the UE 102 can be configured with up to 3 SR configurations.

If the cyclic shift offset $CS_{offset}$ value is 4, there are 2 available cyclic shifts available. Thus, the UE 102 can be configured with up to 2 SR configurations.

If the cyclic shift offset $CS_{offset}$ value is 6, there is only 1 available cyclic shift available. Thus, the UE 102 can be configured with only one SR configuration.

In summary, the maximum number of SR configurations $$= \min\left(8, \frac{12}{CS_{offset} - 1}\right).$$

On the other hand, the cyclic shift offset $CS_{offset}$ value may be determined based on the number of SR configurations of the given UE 102, i.e.

$$CS_{offset} = \text{floor}\left(\frac{12}{\text{No. of SR configurations}+1}\right) = \left\lfloor\frac{12}{K+1}\right\rfloor$$

where the floor(x) function returns an integer that is smaller or equal to the argument value x.

Therefore, in the case that reporting of multiple SR configurations is supported, different cyclic shift values can be used to indicate which SR configuration is triggered. A cyclic shift offset $CS_{offset}$ value should be determined by one or more of the following methods.

In a first method, the cyclic shift offset $CS_{offset}$ can be specified as a fixed value between 1 and 6 inclusive.

In a second method, the cyclic shift offset $CS_{offset}$ can be indicated by system information in remaining minimum system information (RMSI) as a default value.

In a third method, the cyclic shift offset $CS_{offset}$ can be configured with dedicated higher layer signaling (i.e. RRC signaling). If the cyclic shift offset is indicated by the dedicated RRC signaling, the cyclic shift offset indicated by the dedicated RRC signaling overrides the cyclic shift offset indicated by the RMSI. If the cyclic shift offset is not indicated by dedicated RRC signaling, the cyclic shift offset indicated by system information in remaining minimum system information (RMSI) is used.

In a fourth method, the cyclic shift offset $CS_{offset}$ can be determined based on the number of SR configurations of the given UE 102. For example, $$CS_{offset} = \text{floor}\left(\frac{12}{\text{No. of SR configurations}+1}\right) = \left\lfloor\frac{12}{K+1}\right\rfloor.$$

The SR configurations may be indicated by the dedicated RRC signaling. The number of SR configurations may be determined based on the SR configuration.

There are several methods to determine the number of SR configurations K on a PUCCH format 1 with simultaneous HARQ-ACK and SR reporting. In one method, K is the actual number of SR configurations that overlaps with a HARQ-ACK PUCCH transmission. In this case, K is a variable, in case of implicit $CS_{offset}$ value determination based on K, the value may also change with the K values.

In another method, K is the number of SR configurations by RRC signaling for the UE 102. In this case, the K value is semi-statically determined based on the RRC signaling. In the case of implicit $CS_{offset}$ value determination, the $CS_{offset}$ value is the same regardless the actual number of SR configurations overlapped with the HARQ-ACK PUCCH.

In both cases, the SR configuration ordering within the set of K resources should be determined. Several methods can be implemented. In a first method, the SR index follows the SR configuration indexing in the RRC configuration. This is may be more reliable since the SR configurations are semi-statically configured, and no dynamic handling is necessary.

In a second method, the SR index is based on some ordering and/or combination of them. For example, the starting symbol of each SR configuration with a lower index for a SR that starts earlier; and/or the starting RB location of each SR configuration with a lower SR index with lower RB indexes, and/or the periodicity of the SR configurations with a lower SR index for a SR with shorter periodicity.

It should be noted that if for a given SR configuration, if there are multiple SR resources within the HARQ-ACK PUCCH transmission, it is still counted as one SR configuration.

Benefits of the proposed methods include no extra PUCCH resources are used. Additionally, consistent design is achieved as simultaneous HARQ-ACK and SR with PUCCH format 0. Furthermore, cyclic shift collision may be avoided by scheduling and/or cyclic shift offset $CS_{offset}$ configuration.

In a third case (Case 3), HARQ-ACK reporting may be implemented on PUCCH format 2, 3 and/or 4. PUCCH format 2/3/4 all support more than 2 bits, and the PUCCH resource may be dynamically selected based on the actual UCI payload size. Therefore, if simultaneous HARQ-ACK and SR can be reported on the HARQ-ACK PUCCH resource, SR bits can be appended to HARQ-ACK bits.

If a UCI transmission on a PUCCH from a UE 102 using format 2 or 3 or 4 overlaps in time with K PUCCH resources, each configured for a SR, X bits are used to represent a SR being indicated by the UE 102 and appended to the end of the HARQ-ACK followed by CSI. Note that X bits are used to indicate both the presence or absence of SR and which of the K configured SR is embedded. The total number of states for SR including absence of SR and K configurations is K+1, thus, X can be determined by X=ceil (log 2(K+1)).

There are several methods to determine the number of SR configurations K and the number of bits X on a PUCCH format 2/3/4 with simultaneous HARQ-ACK and SR reporting. In one method, K is the actual number of SR configurations that overlaps with a HARQ-ACK PUCCH transmission. In this case, K is a variable, the appended number of bits X for SR depends on the actual number of SR resources in a slot that overlaps with the HARQ-ACK PUCCH.

In another method, K is the number of SR configurations by RRC signaling for the UE. In this case, the K value is semi-statically determined based on the RRC signaling. And the X can be determined semi-statically regardless the actual number of SR configurations overlapped with the HARQ-ACK PUCCH. This can be viewed as the worst case scenario where all SR configurations collide with the HARQ-ACK PUCCH transmission.

In both cases, the SR configuration ordering within the set of K resources should be determined, several methods can be considered. In a first method (Method 1), the SR index follows the SR configuration indexing in the RRC configuration. This is more reliable since the SR configurations are semi-statically configured, and no dynamic handling is necessary. In a second method (Method 2), the SR index is based on some ordering and/or combination of them. For example, the starting symbol of each SR configuration with a lower index for a SR that starts earlier; and/or the starting RB location of each SR configuration with a lower SR index with lower RB indexes, and/or the periodicity of the SR configurations with a lower SR index for a SR with shorter periodicity.

It should be noted that if for a given SR configuration, if there are multiple SR resources within the HARQ-ACK PUCCH transmission, it is still counted as one SR configuration.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for simultaneous HARQ-ACK and SR transmission on an NR PUCCH as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

FIG. 2 is an example illustrating combinations of PUCCH collisions between short PUCCH and short PUCCH. FIG. 2 includes fully overlap cases and partial overlap cases.

FIG. 3 is an example illustrating combinations of PUCCH collisions between short PUCCH and long PUCCH. FIG. 3 includes fully overlap cases and partial overlap cases.

FIG. 4 is an example illustrating combinations of PUCCH collisions between long PUCCH and long PUCCH. FIG. 4 includes fully overlap cases and partial overlap cases.

Figure 5:
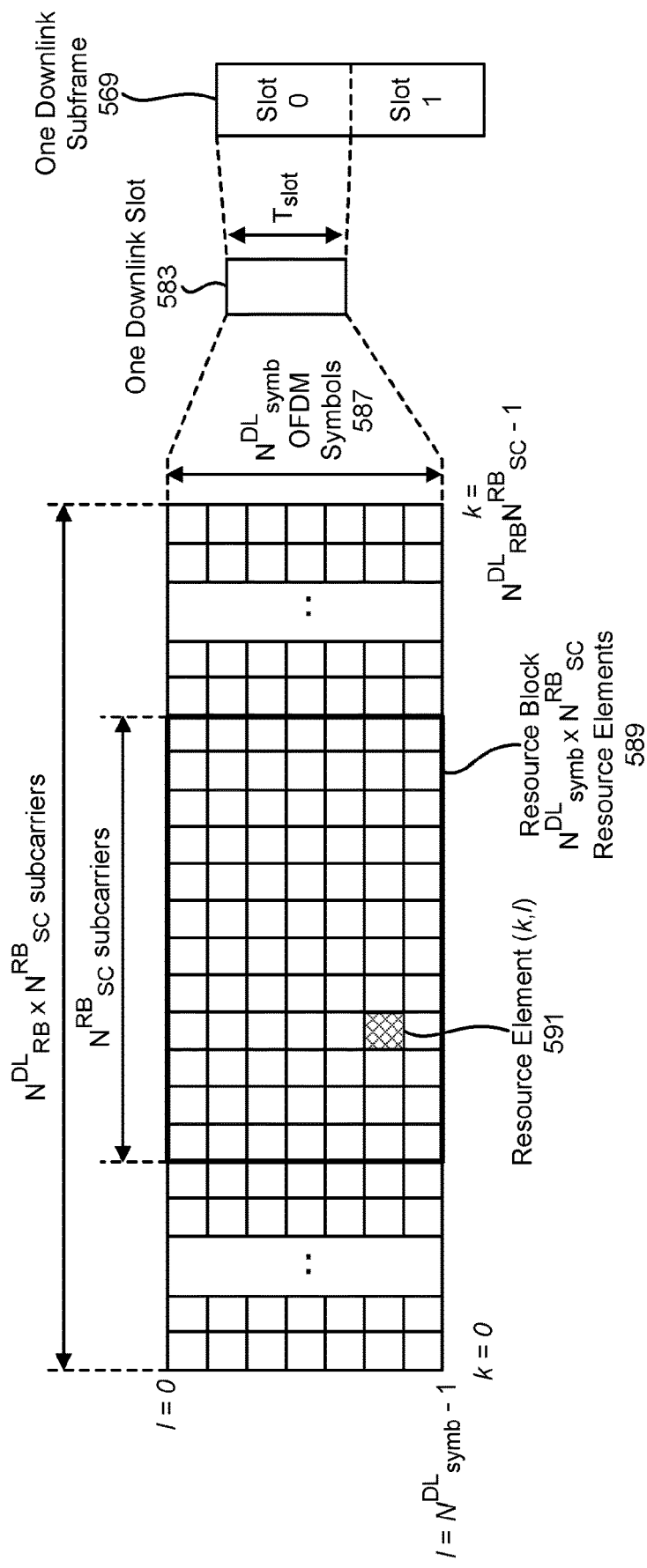
FIG. 5 is a diagram illustrating an example of a resource grid for the downlink.

FIG. 5 is a diagram illustrating one example of a resource grid for the downlink. The resource grid illustrated in FIG. 5 may be utilized in some implementations of the systems and methods disclosed herein. More detail regarding the resource grid is given in connection with FIG. 1.

In FIG. 5, one downlink subframe 569 may include two downlink slots 583. $N^{DL}_{RB}$ is downlink bandwidth configuration of the serving cell, expressed in multiples of $N^{RB}_{SC}$, where $N^{RB}_{SC}$ is a resource block 589 size in the frequency domain expressed as a number of subcarriers, and $N^{DL}_{symb}$ is the number of OFDM symbols 587 in a downlink slot 583. A resource block 589 may include a number of resource elements (RE) 591.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 591 may be the RE 591 whose index l fulfils l≥$l_{data,start}$ and/or $l_{data,end}$≥ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 6:
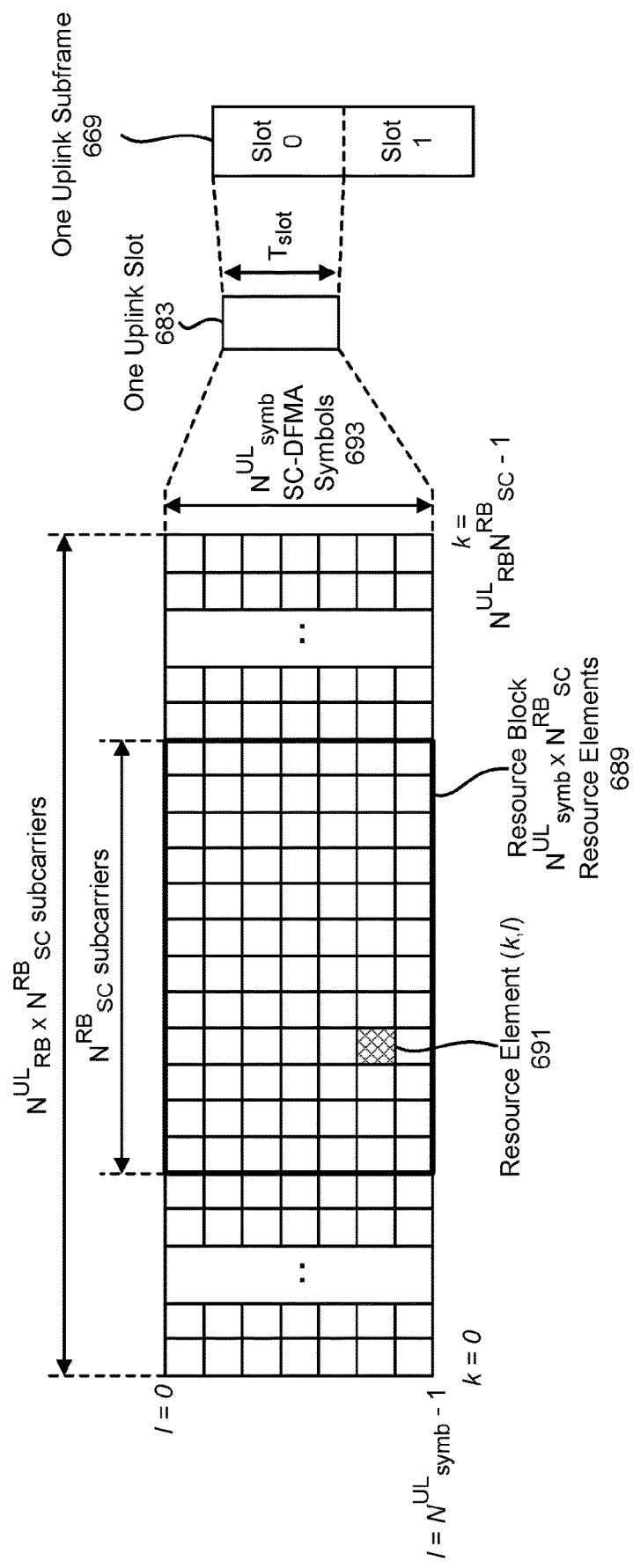
FIG. 6 is a diagram illustrating one example of a resource grid for the uplink.

FIG. 6 is a diagram illustrating one example of a resource grid for the uplink. The resource grid illustrated in FIG. 6 may be utilized in some implementations of the systems and methods disclosed herein. More detail regarding the resource grid is given in connection with FIG. 1.

In FIG. 6, one uplink subframe 669 may include two uplink slots 683. $N^{UL}_{RB}$ is uplink bandwidth configuration of the serving cell, expressed in multiples of $N^{RB}_{SC}$, where $N^{RB}_{SC}$ is a resource block 689 size in the frequency domain expressed as a number of subcarriers, and $N^{UL}_{symb}$ is the number of SC-FDMA symbols 693 in an uplink slot 683. A resource block 689 may include a number of resource elements (RE) 691.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 7:
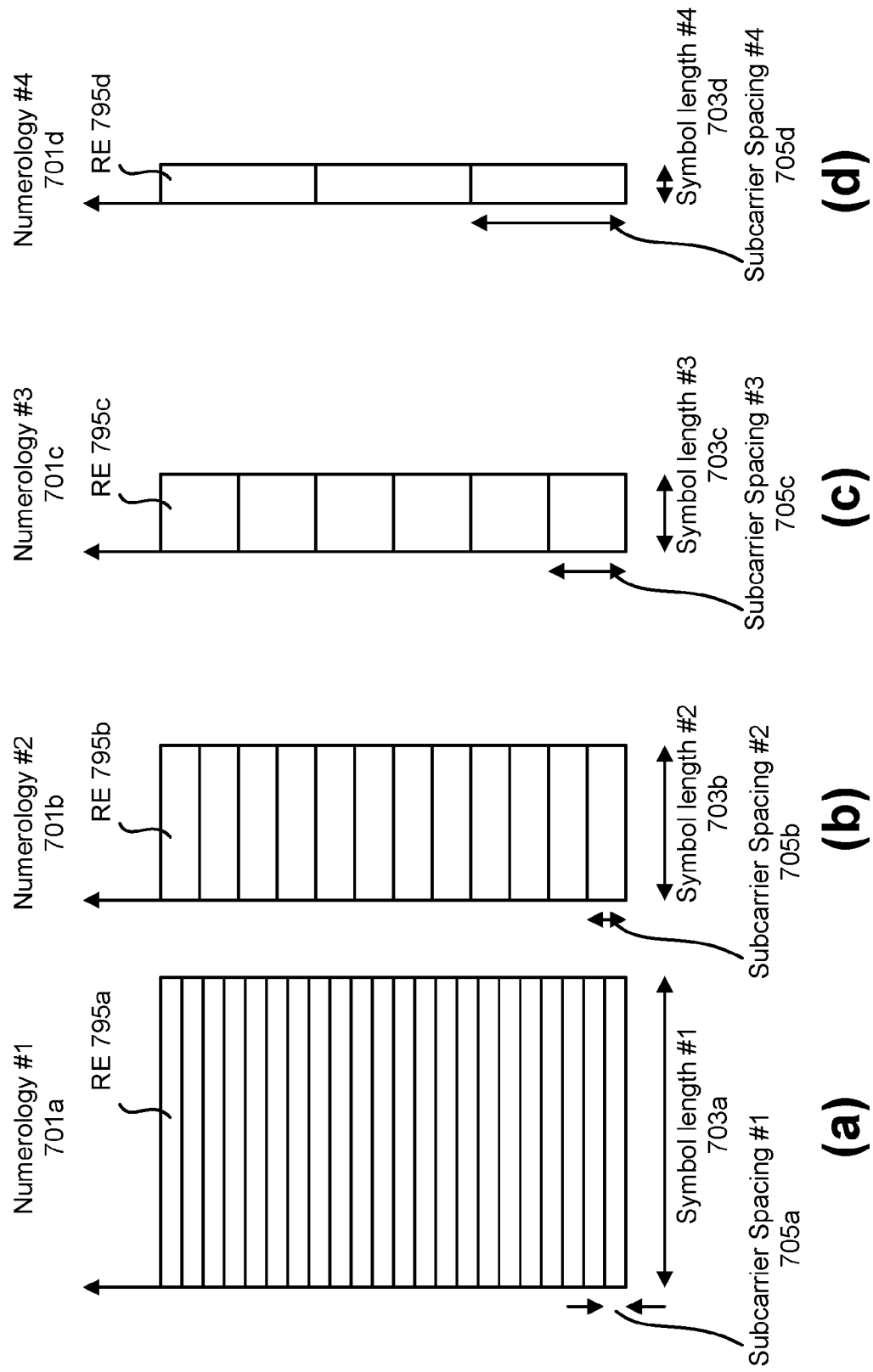
FIG. 7 shows examples of several numerologies.

FIG. 7 shows examples of several numerologies 701. The numerology #1 701a may be a basic numerology (e.g., a reference numerology). For example, a RE 795a of the basic numerology 701a may be defined with subcarrier spacing 705a of 15 kHz in frequency domain and 2048 Ts+CP length (e.g., 160 Ts or 144Ts) in time domain (i.e., symbol length #1 703a), where Ts denotes a baseband sampling time unit defined as 1/(15000*2048) seconds. For the i-th numerology, the subcarrier spacing 705 may be equal to $15*2^i$ and the effective OFDM symbol length $2048*2^{-i}$*Ts. It may cause the symbol length is $2048*2^{-i}$*Ts+CP length (e.g., $160*2^{-i}$*Ts or $144*2^{-i}$*Ts). In other words, the subcarrier spacing of the i+1-th numerology is a double of the one for the i-th numerology, and the symbol length of the i+1-th numerology is a half of the one for the i-th numerology. FIG. 7 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 8:
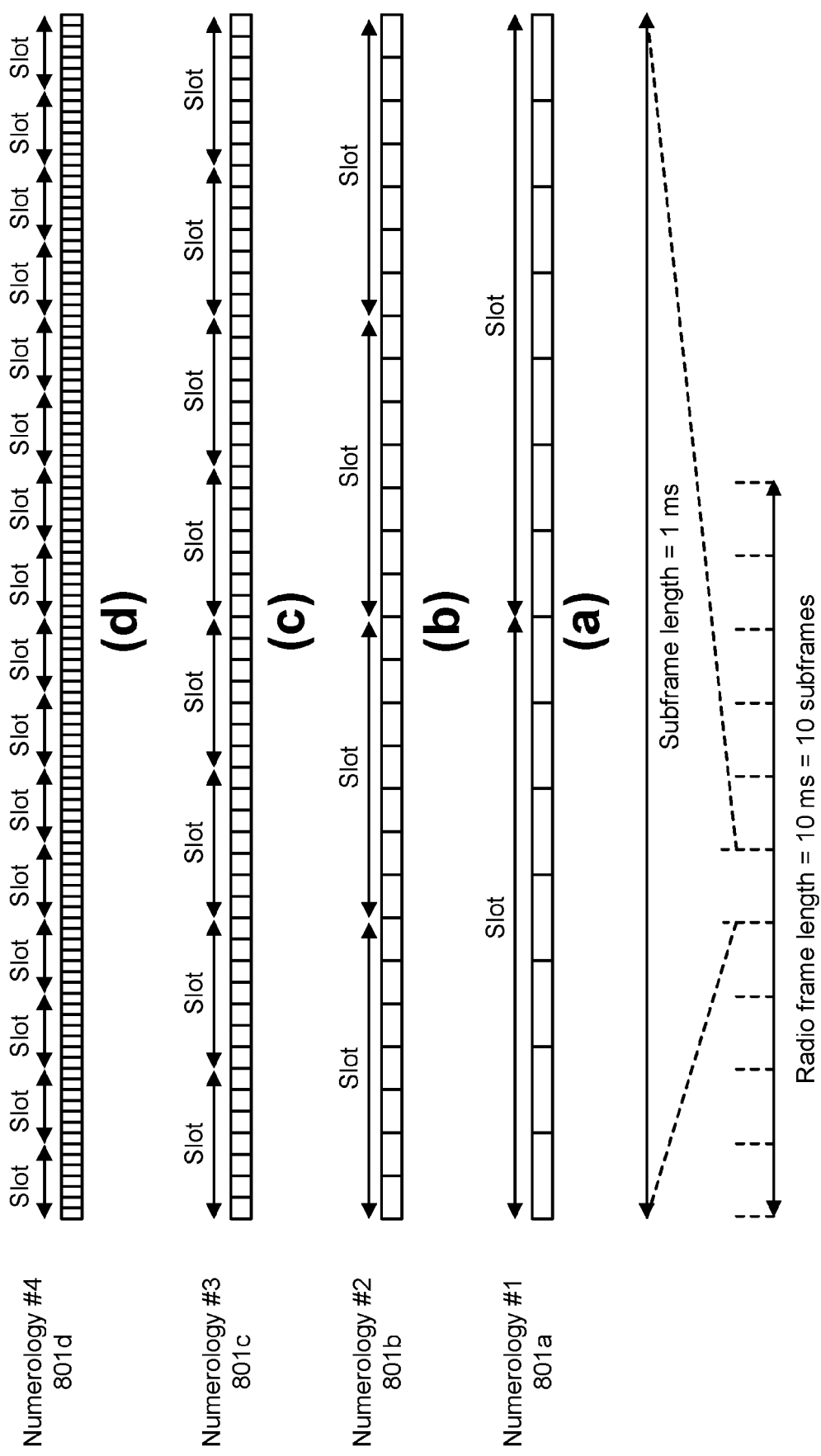
FIG. 8 shows examples of subframe structures for the numerologies that are shown in FIG. 7.

FIG. 8 shows examples of subframe structures for the numerologies 801 that are shown in FIG. 7. Given that a slot 583 includes $N^{DL}_{symb}$ (or $N^{UL}_{symb}$)=7 symbols, the slot length of the i+1-th numerology 801 is a half of the one for the i-th numerology 801, and eventually the number of slots 583 in a subframe (i.e., 1 ms) becomes double. It may be noted that a radio frame may include 10 subframes, and the radio frame length may be equal to 10 ms.

Figure 9:
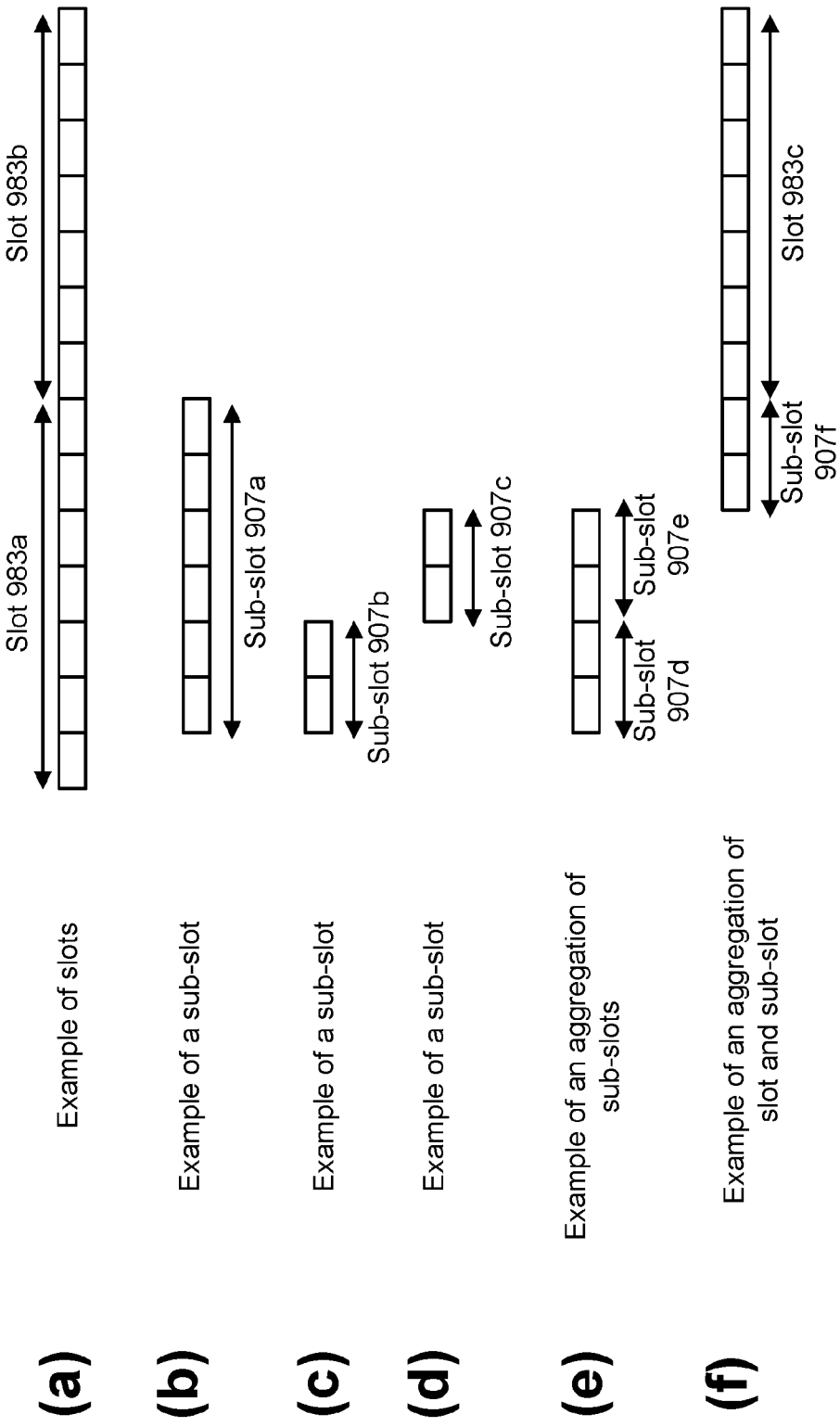
FIG. 9 shows examples of slots and sub-slots.

FIG. 9 shows examples of slots 983 and sub-slots 907. If a sub-slot 907 is not configured by higher layer, the UE 102 and the eNB/gNB 160 may only use a slot 983 as a scheduling unit. More specifically, a given transport block may be allocated to a slot 983. If the sub-slot 907 is configured by higher layer, the UE 102 and the eNB/gNB 160 may use the sub-slot 907 as well as the slot 983. The sub-slot 907 may include one or more OFDM symbols. The maximum number of OFDM symbols that constitute the sub-slot 907 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 907 may start at any symbol within a slot 983 unless it collides with a control channel. There could be restrictions of mini-slot length based on restrictions on starting position. For example, the sub-slot 907 with the length of $N^{DL}_{sym}-1$ (or $N^{UL}_{sym}-1$) may start at the second symbol in a slot 983. The starting position of a sub-slot 907 may be indicated by a physical layer control channel (e.g., by DCI format). Alternatively, the starting position of a sub-slot 907 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 907.

In cases when the sub-slot 907 is configured, a given transport block may be allocated to either a slot 983, a sub-slot 907, aggregated sub-slots 907 or aggregated sub-slot(s) 907 and slot 983. This unit may also be a unit for HARQ-ACK bit generation.

Figure 10:
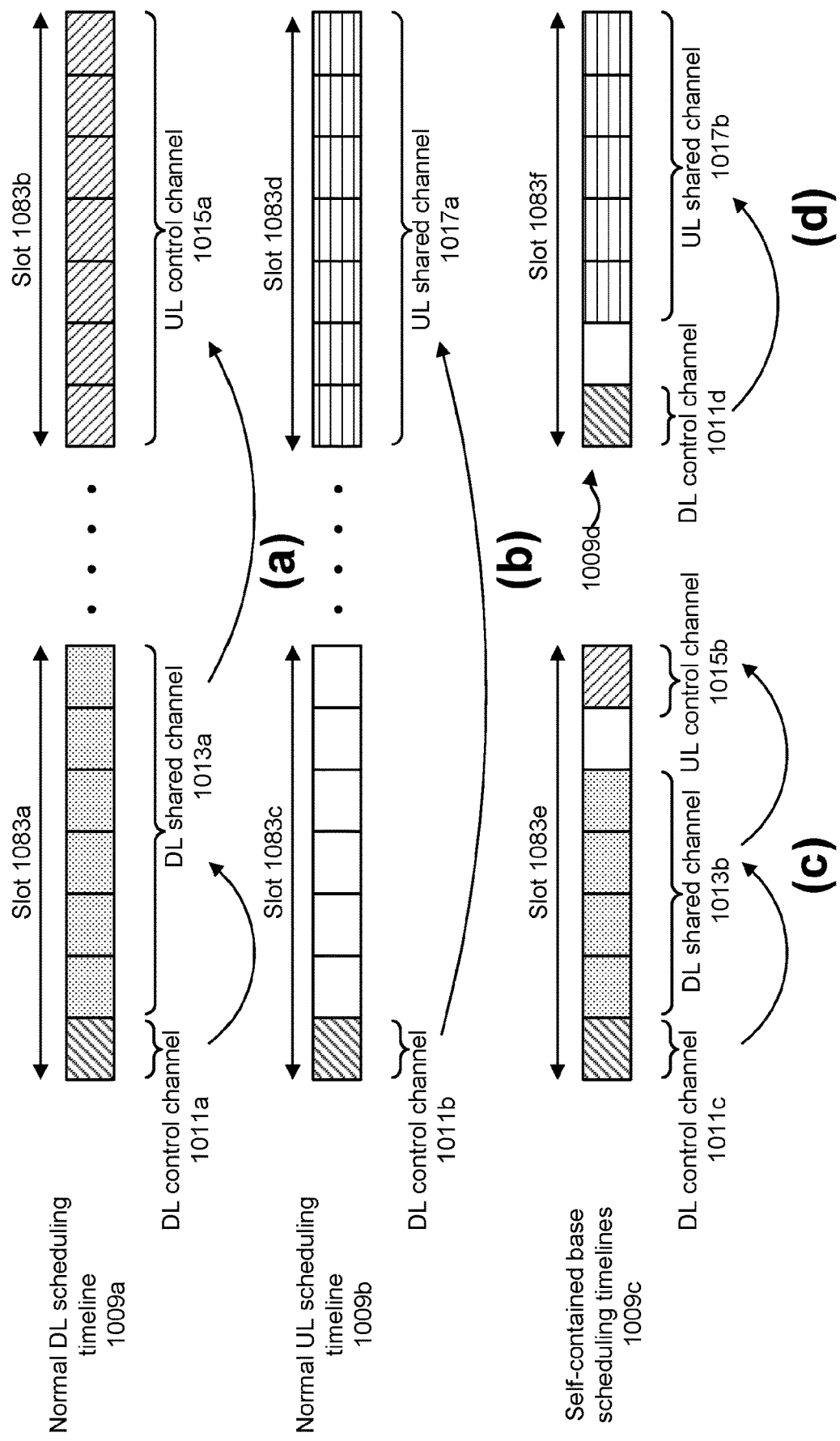
FIG. 10 shows examples of scheduling timelines.

FIG. 10 shows examples of scheduling timelines 1009. For a normal DL scheduling timeline 1009a, DL control channels are mapped the initial part of a slot 1083a. The DL control channels 1011 schedule DL shared channels 1013a in the same slot 1083a. HARQ-ACKs for the DL shared channels 1013a (i.e., HARQ-ACKs each of which indicates whether or not transport block in each DL shared channel 1013a is detected successfully) are reported via UL control channels 1015a in a later slot 1083b. In this instance, a given slot 1083 may contain either one of DL transmission and UL transmission.

For a normal UL scheduling timeline 1009b, DL control channels 1011b are mapped the initial part of a slot 1083c. The DL control channels 1011b schedule UL shared channels 1017a in a later slot 1083d. For these cases, the association timing (time shift) between the DL slot 1083c and the UL slot 1083d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1009c, DL control channels 1011c are mapped to the initial part of a slot 1083e. The DL control channels 1011c schedule DL shared channels 1013b in the same slot 1083e. HARQ-ACKs for the DL shared channels 1013b are reported in UL control channels 1015b, which are mapped at the ending part of the slot 1083e.

For a self-contained base UL scheduling timeline 1009d, DL control channels 1011d are mapped to the initial part of a slot 1083f. The DL control channels 1011d schedule UL shared channels 1017b in the same slot 1083f. For these cases, the slot 1083f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 11:
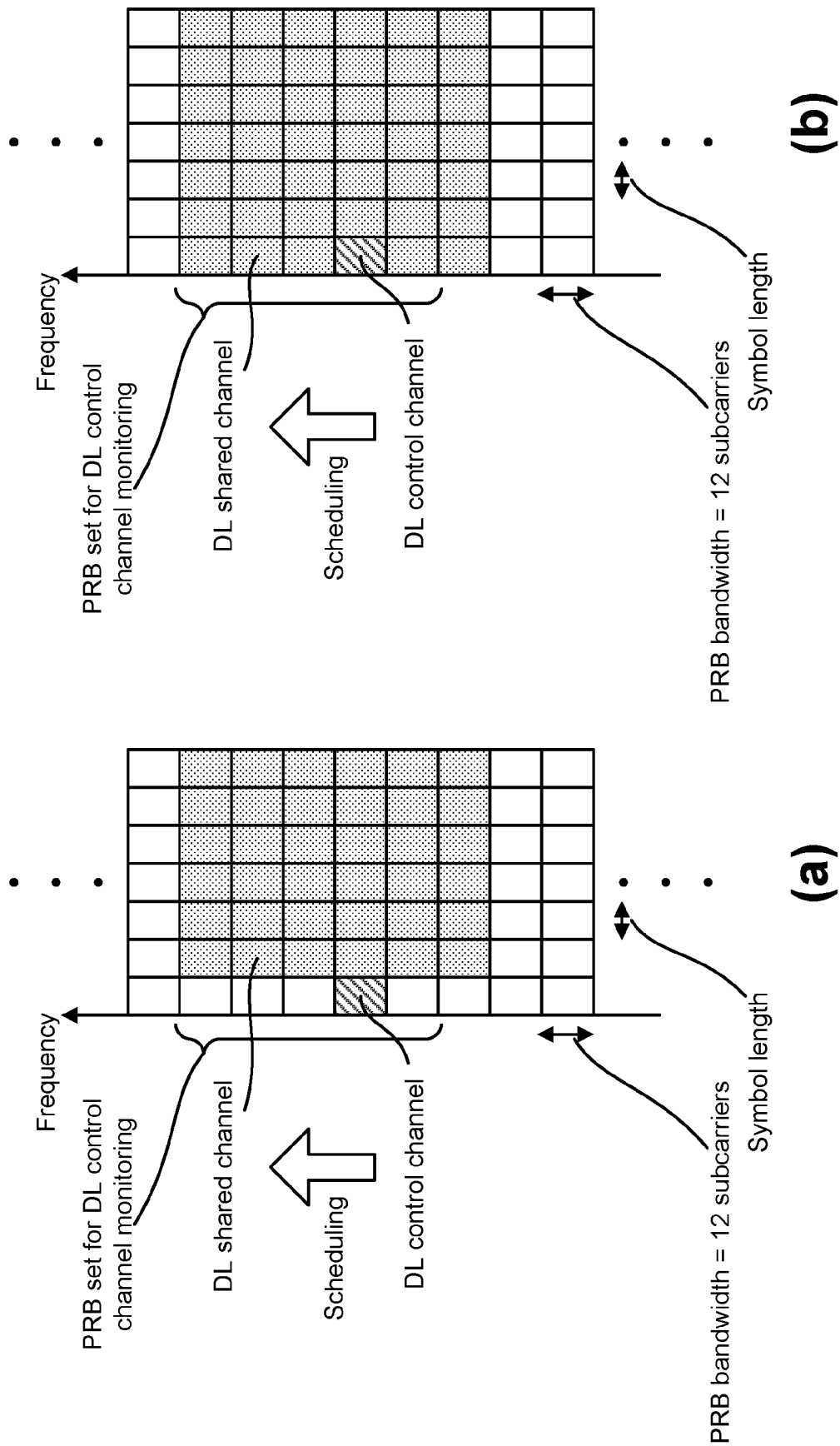
FIG. 11 shows examples of DL control channel monitoring regions.

FIG. 11 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 12:
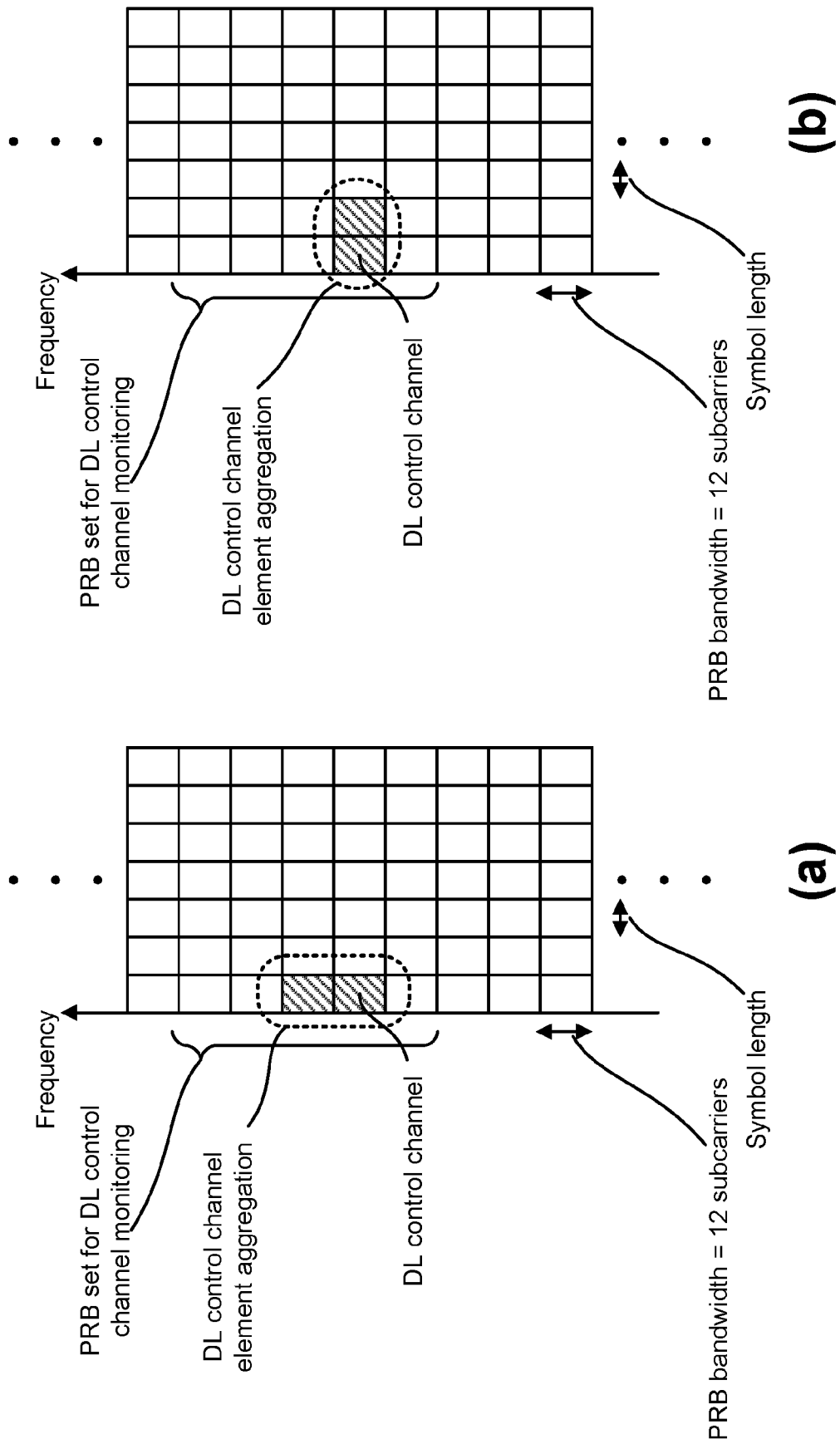
FIG. 12 shows examples of DL control channel which includes more than one control channel elements.

FIG. 12 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 13:
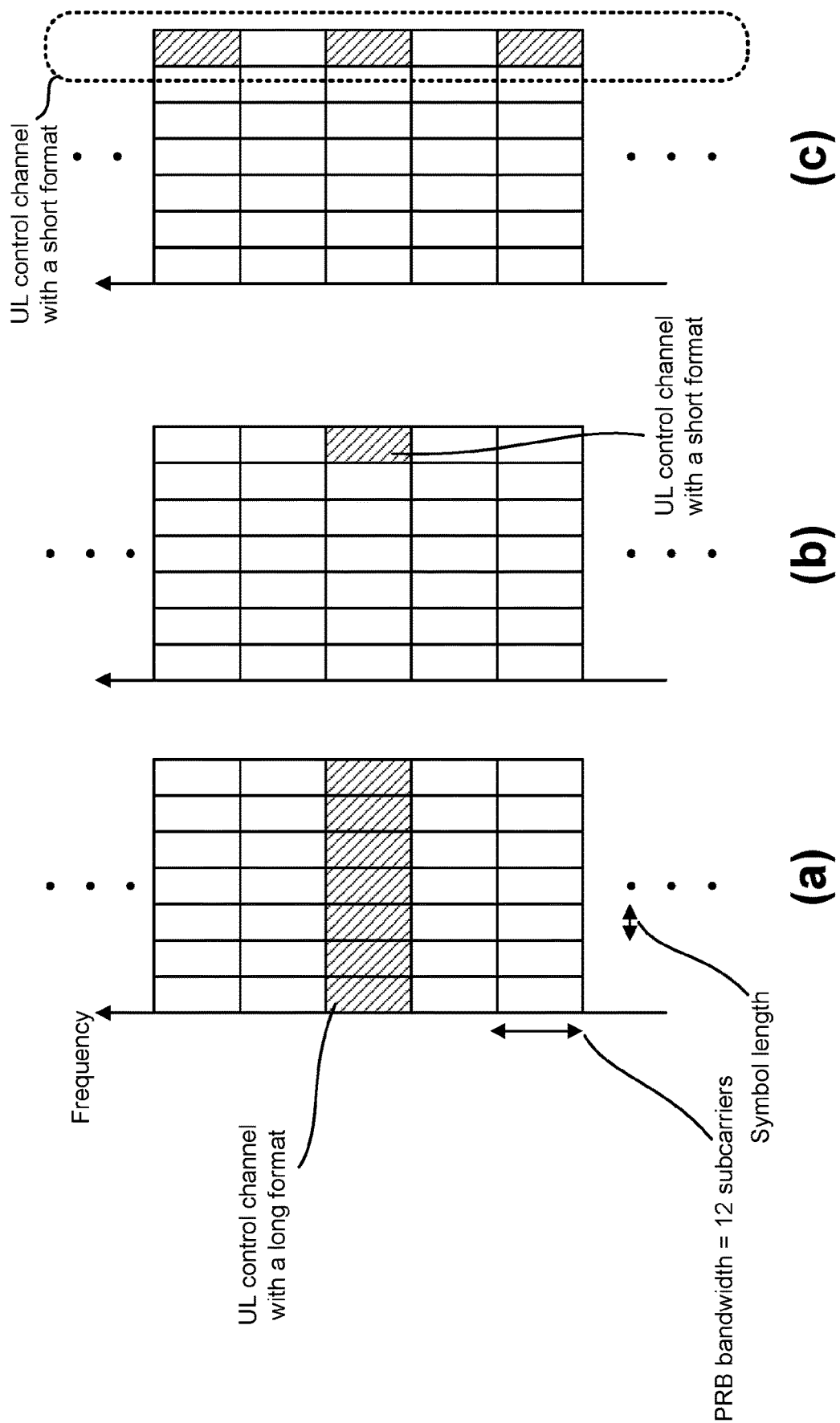
FIG. 13 shows examples of UL control channel structures.

FIG. 13 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 14:
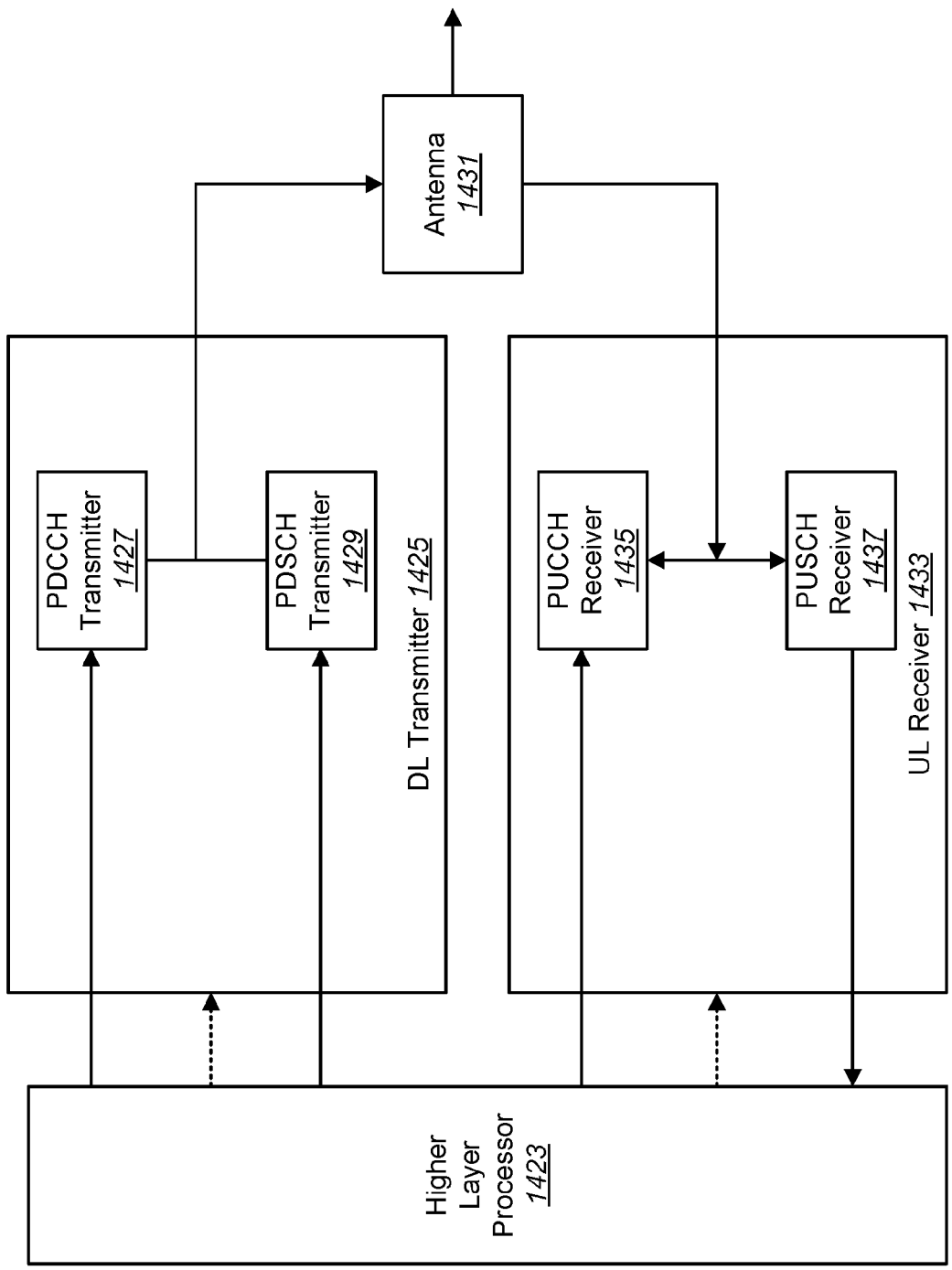
FIG. 14 is a block diagram illustrating one implementation of a gNB.

FIG. 14 is a block diagram illustrating one implementation of a gNB 1460. The gNB 1460 may include a higher layer processor 1423, a DL transmitter 1425, a UL receiver 1433, and one or more antenna 1431. The DL transmitter 1425 may include a PDCCH transmitter 1427 and a PDSCH transmitter 1429. The UL receiver 1433 may include a PUCCH receiver 1435 and a PUSCH receiver 1437.

The higher layer processor 1423 may manage physical layer's behaviors (the DL transmitter's and the UL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PDSCH transmitter transport blocks and provide the PDCCH transmitter transmission parameters related to the transport blocks.

The DL transmitter 1425 may multiplex downlink physical channels and downlink physical signals (including reservation signal) and transmit them via transmission antennas 1431. The UL receiver 1433 may receive multiplexed uplink physical channels and uplink physical signals via receiving antennas 1431 and de-multiplex them. The PUCCH receiver 1435 may provide the higher layer processor 1423 UCI. The PUSCH receiver 1437 may provide the higher layer processor 1423 received transport blocks.

Figure 15:
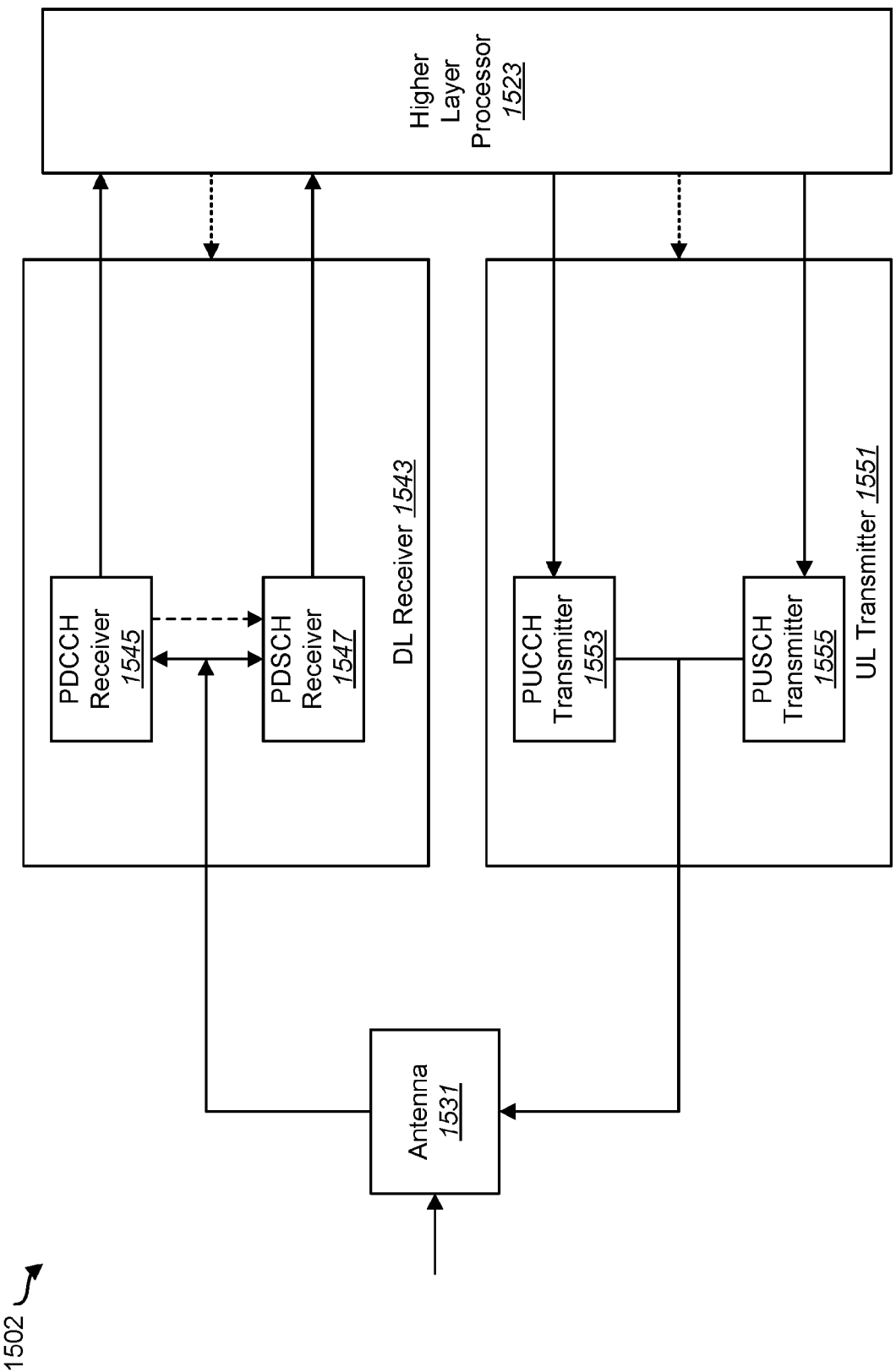
FIG. 15 is a block diagram illustrating one implementation of a UE.

FIG. 15 is a block diagram illustrating one implementation of a UE 1502. The UE 1502 may include a higher layer processor 1523, a UL transmitter 1551, a DL receiver 1543, and one or more antenna 1531. The UL transmitter 1551 may include a PUCCH transmitter 1553 and a PUSCH transmitter 1555. The DL receiver 1543 may include a PDCCH receiver 1545 and a PDSCH receiver 1547.

The higher layer processor 1523 may manage physical layer's behaviors (the UL transmitter's and the DL receiver's behaviors) and provide higher layer parameters to the physical layer. The higher layer processor 1523 may obtain transport blocks from the physical layer. The higher layer processor 1523 may send/acquire higher layer messages such as an RRC message and MAC message to/from a UE's higher layer. The higher layer processor 1523 may provide the PUSCH transmitter transport blocks and provide the PUCCH transmitter 1553 UCI.

The DL receiver 1543 may receive multiplexed downlink physical channels and downlink physical signals via receiving antennas 1531 and de-multiplex them. The PDCCH receiver 1545 may provide the higher layer processor 1523 DCI. The PDSCH receiver 1547 may provide the higher layer processor 1523 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 16:
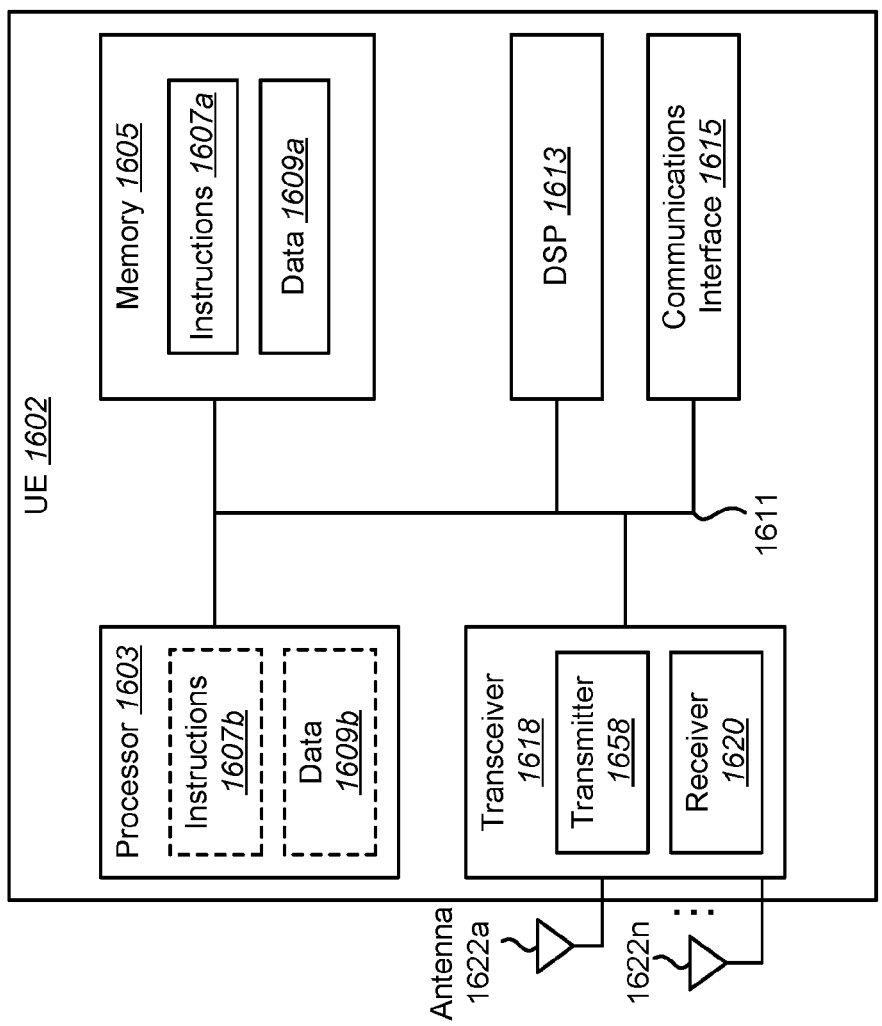
FIG. 16 illustrates various components that may be utilized in a UE.

FIG. 16 illustrates various components that may be utilized in a UE 1602. The UE 1602 described in connection with FIG. 16 may be implemented in accordance with the UE 102 described in connection with FIG. 1. The UE 1602 includes a processor 1603 that controls operation of the UE 1602. The processor 1603 may also be referred to as a central processing unit (CPU). Memory 1605, which may include read-only memory (ROM), random access memory (RAM), a combination of the two or any type of device that may store information, provides instructions 1607*a* and data 1609*a* to the processor 1603. A portion of the memory 1605 may also include non-volatile random-access memory (NVRAM). Instructions 1607*b* and data 1609*b* may also reside in the processor 1603. Instructions 1607*b* and/or data 1609*b* loaded into the processor 1603 may also include instructions 1607*a* and/or data 1609*a* from memory 1605 that were loaded for execution or processing by the processor 1603. The instructions 1607*b* may be executed by the processor 1603 to implement the methods described above.

The UE 1602 may also include a housing that contains one or more transmitters 1658 and one or more receivers 1620 to allow transmission and reception of data. The transmitter(s) 1658 and receiver(s) 1620 may be combined into one or more transceivers 1618. One or more antennas 1622*a-n* are attached to the housing and electrically coupled to the transceiver 1618.

The various components of the UE 1602 are coupled together by a bus system 1611, which may include a power bus, a control signal bus and a status signal bus, in addition to a data bus. However, for the sake of clarity, the various buses are illustrated in FIG. 16 as the bus system 1611. The UE 1602 may also include a digital signal processor (DSP) 1613 for use in processing signals. The UE 1602 may also include a communications interface 1615 that provides user access to the functions of the UE 1602. The UE 1602 illustrated in FIG. 16 is a functional block diagram rather than a listing of specific components.

Figure 17:
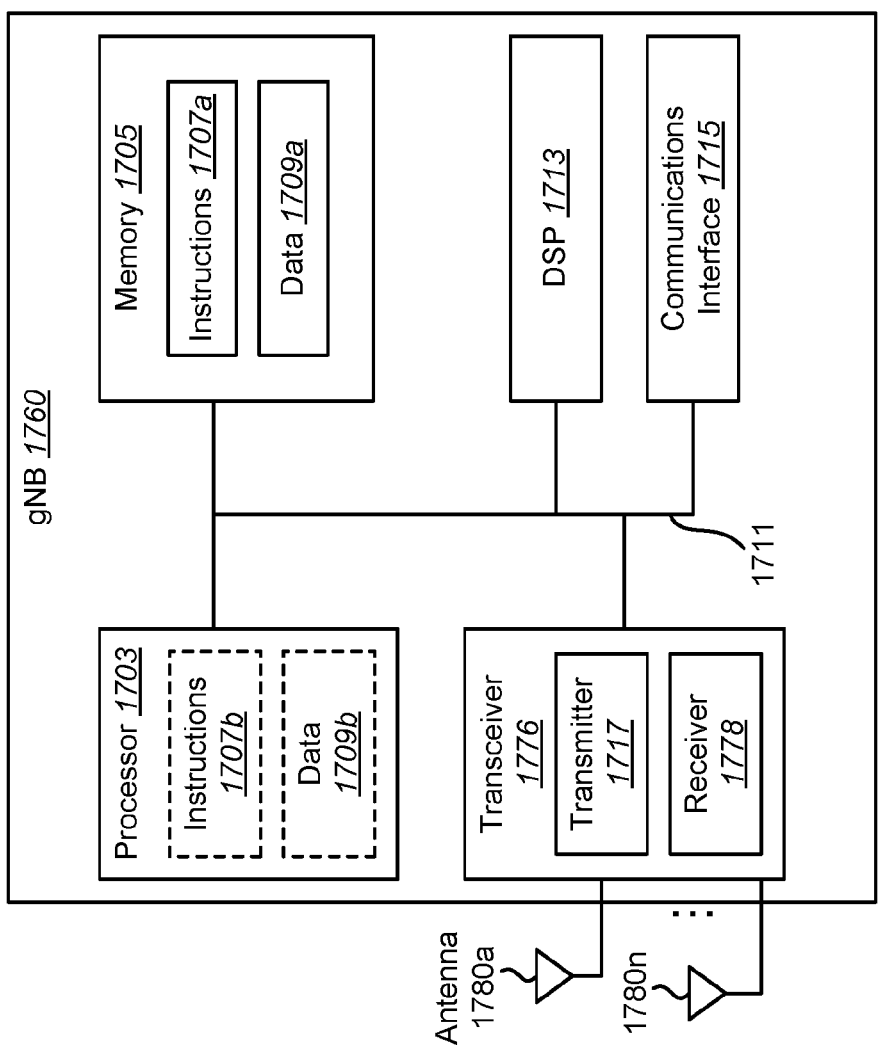
FIG. 17 illustrates various components that may be utilized in a gNB.

FIG. 17 illustrates various components that may be utilized in a gNB 1760. The gNB 1760 described in connection with FIG. 17 may be implemented in accordance with the gNB 160 described in connection with FIG. 1. The gNB 1760 includes a processor 1703 that controls operation of the gNB 1760. The processor 1703 may also be referred to as a central processing unit (CPU). Memory 1705, which may include read-only memory (ROM), random access memory (RAM), a combination of the two or any type of device that may store information, provides instructions 1707*a* and data 1709*a* to the processor 1703. A portion of the memory 1705 may also include non-volatile random-access memory (NVRAM). Instructions 1707*b* and data 1709*b* may also reside in the processor 1703. Instructions 1707*b* and/or data 1709*b* loaded into the processor 1703 may also include instructions 1707*a* and/or data 1709*a* from memory 1705 that were loaded for execution or processing by the processor 1703. The instructions 1707*b* may be executed by the processor 1703 to implement the methods described above.

The gNB 1760 may also include a housing that contains one or more transmitters 1717 and one or more receivers 1778 to allow transmission and reception of data. The transmitter(s) 1717 and receiver(s) 1778 may be combined into one or more transceivers 1776. One or more antennas 1780a-n are attached to the housing and electrically coupled to the transceiver 1776.

The various components of the gNB 1760 are coupled together by a bus system 1711, which may include a power bus, a control signal bus and a status signal bus, in addition to a data bus. However, for the sake of clarity, the various buses are illustrated in FIG. 17 as the bus system 1711. The gNB 1760 may also include a digital signal processor (DSP) 1713 for use in processing signals. The gNB 1760 may also include a communications interface 1715 that provides user access to the functions of the gNB 1760. The gNB 1760 illustrated in FIG. 17 is a functional block diagram rather than a listing of specific components.

Figure 18:
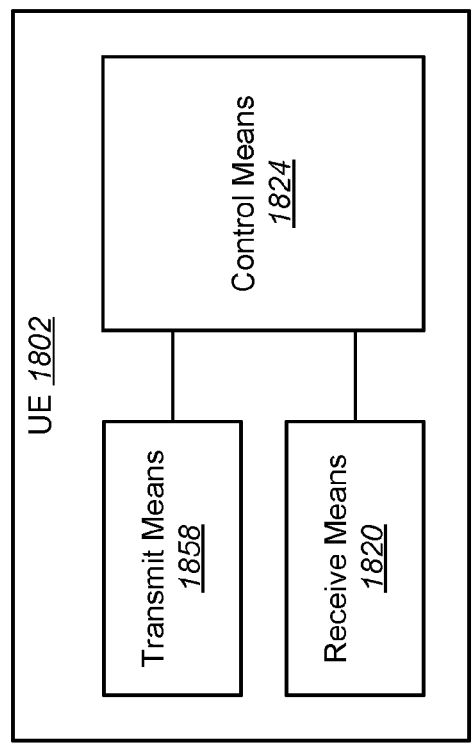
FIG. 18 is a block diagram illustrating one implementation of a UE in which systems and methods for simultaneous HARQ-ACK and SR transmission on NR PUCCH may be implemented.

FIG. 18 is a block diagram illustrating one implementation of a UE 1802 in which systems and methods for simultaneous HARQ-ACK and SR transmission on NR PUCCH may be implemented. The UE 1802 includes transmit means 1858, receive means 1820 and control means 1824. The transmit means 1858, receive means 1820 and control means 1824 may be configured to perform one or more of the functions described in connection with FIG. 1 above. FIG. 16 above illustrates one example of a concrete apparatus structure of FIG. 18. Other various structures may be implemented to realize one or more of the functions of FIG. 1. For example, a DSP may be realized by software.

Figure 19:
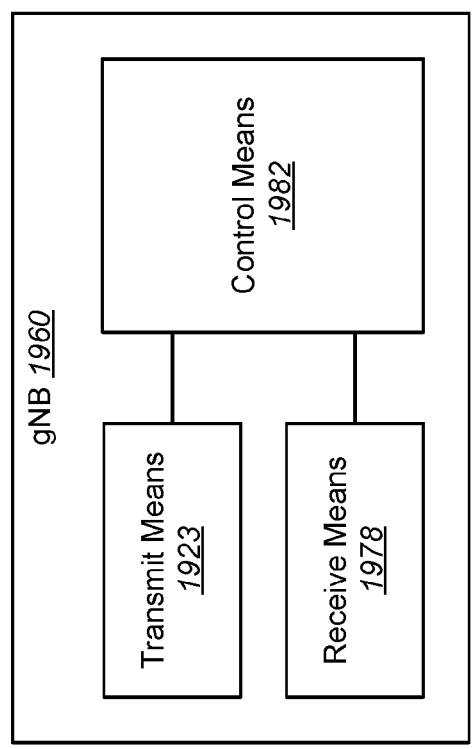
FIG. 19 is a block diagram illustrating one implementation of a gNB in which systems and methods for simultaneous HARQ-ACK and SR transmission on NR PUCCH may be implemented.

FIG. 19 is a block diagram illustrating one implementation of a gNB 1960 in which systems and methods for simultaneous HARQ-ACK and SR transmission on NR PUCCH may be implemented. The gNB 1960 includes transmit means 1923, receive means 1978 and control means 1982. The transmit means 1923, receive means 1978 and control means 1982 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE), comprising:
receiving circuitry configured to receive a physical downlink shared channel (PDSCH); and
transmitting circuitry configured to transmit hybrid automatic repeat request acknowledgment/negative acknowledgement (HARQ-ACK) for the PDSCH and scheduling request (SR) on a physical uplink control channel (PUCCH) scheduled for the HARQ-ACK transmission with PUCCH format 2, PUCCH format 3 or PUCCH format 4, wherein
the HARQ-ACK and the SR are transmitted on the PUCCH by appending a number of bits for SR to the HARQ-ACK, wherein the number of bits for SR appended to HARQ-ACK bits is determined by ceil(log2(K+1)), where K PUCCHs are configured to be transmitted for respective K SRs with SR transmission occasions that would overlap with a transmission of the PUCCH with HARQ-ACK information from the UE in a slot,
order of the SR within the K SRs is indicated by a SR configuration index in a RRC configuration, and
SR configurations are semi-statically configured.

2. A base station apparatus, comprising:
transmitting circuitry configured to transmit a physical downlink shared channel (PDSCH); and
receiving circuitry configured to receive hybrid automatic repeat request acknowledgment/negative acknowledgement (HARQ-ACK) for the PDSCH and scheduling request (SR) on a physical uplink control channel (PUCCH) scheduled for the HARQ-ACK reception with PUCCH format 2, PUCCH format 3 or PUCCH format 4, wherein
the HARQ-ACK and the SR are received on the PUCCH, a number of bits for SR being appended to the HARQ-ACK, wherein the number of bits for SR appended to HARQ-ACK bits is determined by ceil(log2(K+1)), where K PUCCHs are configured to be received for respective K SRs with SR reception occasions that would overlap with a reception of the PUCCH with HARQ-ACK information from the UE in a slot,
order of the SR within the K SRs is indicated by a SR configuration index in a RRC configuration, and
SR configurations are semi-statically configured.

3. A communication method of a user equipment comprising:
receiving a physical downlink shared channel (PDSCH); and
transmitting hybrid automatic repeat request acknowledgment/negative acknowledgement (HARQ-ACK) for the PDSCH and scheduling request (SR) on a physical uplink control channel (PUCCH) scheduled for the HARQ-ACK transmission with PUCCH format 2, PUCCH format 3 or PUCCH format 4, wherein
the HARQ-ACK and the SR are transmitted on the PUCCH by appending a number of bits for SR to the HARQ-ACK, wherein the number of bits for SR appended to HARQ-ACK bits is determined by ceil(log2(K+1)), where K PUCCHs are configured to be transmitted for respective K SRs with SR transmission occasions that would overlap with a transmission of the PUCCH with HARQ-ACK information from the UE in a slot,
order of the SR within the K SRs is indicated by a SR configuration index in a RRC configuration, and
SR configurations are semi-statically configured.

4. A communication method of a base station apparatus, comprising:
transmitting a physical downlink shared channel (PDSCH); and
receiving hybrid automatic repeat request acknowledgment/negative acknowledgement (HARQ-ACK) for the PDSCH and scheduling request (SR) on a physical uplink control channel (PUCCH) scheduled for the HARQ-ACK reception with PUCCH format 2, PUCCH format 3 or PUCCH format 4, wherein
the HARQ-ACK and the SR are received on the PUCCH, a number of bits for SR being appended to the HARQ-ACK, wherein the number of bits for SR appended to HARQ-ACK bits is determined by ceil(log2(K+1)), where K PUCCHs are configured to be received for respective K SRs with SR reception occasions that would overlap with a reception of the PUCCH with HARQ-ACK information from the UE in a slot,
order of the SR within the K SRs is indicated by a SR configuration index in a RRC configuration, and
SR configurations are semi-statically configured.

* * * * *